United States Patent [19]

Gyota et al.

[11] Patent Number: 6,056,863

[45] Date of Patent: May 2, 2000

[54] METHOD AND APPARATUS FOR MANUFACTURING COLOR FILTER

[75] Inventors: Kozo Gyota; Akihiko Uematsu; Sadaaki Sakai; Toshinori Sumita; Fumiaki Matsushima, all of Nagano-ken, Japan

[73] Assignee: Seiko Epson Corporation, Tokyo, Japan

[21] Appl. No.: 08/875,177

[22] PCT Filed: Nov. 20, 1996

[86] PCT No.: PCT/JP96/03392

§ 371 Date: Jul. 21, 1996

§ 102(e) Date: Jul. 21, 1996

[87] PCT Pub. No.: WO97/19373

PCT Pub. Date: May 29, 1997

[30] Foreign Application Priority Data

Nov. 21, 1995 [JP] Japan .................................. 7-303173
Dec. 20, 1995 [JP] Japan .................................. 7-332195

[51] Int. Cl.[7] .................................................. C25D 5/02
[52] U.S. Cl. .......................... 205/118; 205/122; 205/316; 204/508
[58] Field of Search ..................... 205/316, 118; 204/620, 490, 491, 484, 508, 507

[56] References Cited

U.S. PATENT DOCUMENTS

| | | | |
|---|---|---|---|
| 5,206,750 | 4/1993 | Aizawa et al. | 359/68 |
| 5,328,580 | 7/1994 | Reamey | 204/181 |
| 5,399,449 | 3/1995 | Tanimoto et al. | 430/7 |
| 5,429,733 | 7/1995 | Ishida | 204/224 |
| 5,433,837 | 7/1995 | Brunk et al. | 204/299 R |
| 5,443,704 | 8/1995 | Kirkpatrick et al. | 204/180.1 |
| 5,580,436 | 12/1996 | Suginoya et al. | 205/122 |
| 5,663,019 | 9/1997 | Matsumura et al. | 430/7 |
| 5,674,369 | 10/1997 | Watanabe et al. | 204/471 |
| 5,739,946 | 4/1998 | Iwanaga et al. | 359/296 |
| 5,766,430 | 6/1998 | Mehler | 204/259 |

FOREIGN PATENT DOCUMENTS

| | | |
|---|---|---|
| 1 60-33507 | 2/1985 | Japan . |
| 61-100729 | 5/1986 | Japan . |
| 3-192205 | 8/1991 | Japan . |
| 3-231703 | 10/1991 | Japan . |
| 3-239205 | 10/1991 | Japan . |
| 4-9902 | 1/1992 | Japan . |
| 4-86602 | 3/1992 | Japan . |
| 4-173995 | 6/1992 | Japan . |
| 5-65696 | 3/1993 | Japan . |

*Primary Examiner*—Kathryn Gorgos
*Assistant Examiner*—Erica Smith-Hicks
*Attorney, Agent, or Firm*—Oliff & Berridge, PLC

[57] ABSTRACT

A method for manufacturing color filters, in which color layers for transmitting light within a specific wavelength range are formed on light-transmissive electrodes formed on a light-transmissive substrate. The light-transmissive electrodes are brought into contact with a deposition solution having an electrolytic solution and a pigment material dispersed therein. A voltage is applied through the contacting portions between the light-transmissive electrodes and the deposition solution. The deposition solution is then electrolyzed between the light-transmissive electrodes and a submerged electrode. Color layers are formed on the light-transmissive electrodes. Examples of possible methods to bring the light-transmissive electrodes into contact with the deposition solution include immersing the light-transmissive electrodes in the deposition solution, engaging the light-transmissive electrodes into contact with the surface of the deposition solution, and other methods.

30 Claims, 12 Drawing Sheets

METHOD AND APPARATUS FOR MANUFACTURING COLOR FILTER

BACKGROUND OF THE INVENTION

1. Field of the Invention

The present invention relates to methods for manufacturing color filters, and apparatuses for carrying out the methods. Particularly, the present invention relates to a method and an apparatus for manufacturing color filters suitably used in liquid-crystal display units, and more particularly, relates to a method and an apparatus for manufacturing color filters based on a manner in which electrodes are brought into contact with a deposition solution comprising an electrolytic solution and a pigment material dispersed therein, and color layers are thereby formed on the electrodes, as in a Micelle electrolyzing method, a electro-deposition method, or the like.

2. Description of Related Art

Generally, in a liquid-crystal display unit, a transparent conductive film comprising, for example, ITO (Indium Tin Oxide) is formed on each surface of a pair of transparent substrates, a plurality of pixel electrodes are constructed with the transparent conductive film, predetermined voltages are selectively applied to some of the pixel electrodes, and thus visible information such as characters and figures is displayed.

In recent years, color-displaying has been increasingly introduced in liquid-crystal display units. In some cases, in order to achieve color-displaying, color filters are formed by coating such pixel electrodes with color layers in the process for manufacturing liquid-crystal display units. Such a method for forming color filters is generally called a COI (Color Filter On ITO) method.

Hitherto, a dyeing method, a printing method, a pigment-dispersing method, an electro-deposition method, and other various methods have been known as methods for coating with color layers. Additionally, a so-called Micelle electrolyzing method as disclosed in Japanese Unexamined Patent Publication No. 2-267298 is known as one of these methods.

In the Micelle electrolyzing method, for example, as shown in FIG. 9, a transparent substrate 102 is dipped in a deposition solution 101 prepared by dispersing a pigment material in an electrolytic solution, a pixel electrode 103 on the transparent substrate 102 is made to serve as an anode while a submerged electrode 104 disposed in the deposition solution 101 is made to serve as a cathode, and the deposition solution 101 is electrolyzed to form a color layer on the pixel electrode 103.

According to the Micelle electrolyzing method, since a color layer is selectively formed on the pixel electrode as an anode to which a voltage is applied, the treatment is easy and deposition accuracy is high. Further, since deposition proceeds by electrolysis, the thickness of the deposited film can be controlled depending on the applied electric charge quantity.

In this conventional method, however, since the voltage is applied to only one end portion of the transparent pixel electrode 103, the color layer becomes thick near the portion for voltage application while it gradually becomes thin in proportion to the distance from the portion. Further, since such thickness irregularity of the color layer in proportion to the distance from the voltage-applied portion is based on the resistance value of the electrode pattern, the thickness irregularity of the color layer further increases in response to the thickness irregularity of the transparent pixel electrode.

Moreover, in deposition, by applying electricity to only one end of the transparent substrate, deposition efficiency is low relative to applied electric current due to the resistance of the pixel electrode pattern.

The present invention has been accomplished in view of the above-described problems, and its object is to provide a method and an apparatus for manufacturing color filters, by which the color layer can be formed so as to have a uniform thickness, the thickness can be highly accurately controlled, and deposition efficiency relative to applied electric current can be improved.

SUMMARY OF THE INVENTION

First Method for Manufacturing a Color Filter

A first method for manufacturing color filters in relation to the present invention is a method which includes forming, on a light-transmissive electrode formed on a light-transmissive substrate, a color layer transmitting light in a specific wavelength range, wherein the method is characterized by comprising:

(1) bringing the light-transmissive electrode into contact with a deposition solution comprising an electrolytic solution and a pigment material dispersed therein; and (2) applying voltage to said light-transmissive electrode through the contacting portion between said light-transmissive electrode and said deposition solution to electrolyze said deposition solution. In descriptions here and below, the term "light-transmissive" means either being transparent, i.e., colorless, or being colored but capable of transmitting light.

In this manufacturing method, the deposition solution is electrolyzed using the light-transmissive electrode on the light-transmissive substrate as an anode, and thereby, the pigment material and other ingredients in the electrolytic solution adhere to the light-transmissive electrode to form a color layer. At this time, the voltage for electrolysis is applied through the contacting portion between the light-transmissive electrode and the deposition solution. Here, the term "the contacting portion between the light-transmissive electrode and the deposition solution" stands for the contacting portion when the light-transmissive electrode touches the surface of the deposition solution, and meanwhile, when the light-transmissive electrode is immersed in the deposition solution, it stands for the portion of the light-transmissive electrode that is submerged in the deposition solution.

As described above, in the first method for manufacturing color filters, since voltage is applied through the contacting portion between the light-transmissive electrode and the deposition solution, the color layer can be formed more uniformly in thickness, the thickness can be highly accurately controlled, and further, deposition efficiency relative to the applied electric current can be improved, as compared to a case where voltage is conventionally applied at only one end of the light-transmissive electrode.

As to the first method for manufacturing color filters, several embodiments described below can be considered. In a first embodiment, (1) the deposition solution is placed in a processing bath; (2) the light-transmissive substrate is immersed in the processing bath; and (3) voltage is applied through the submerged portion of the light-transmissive electrode on the light-transmissive substrate to electrolyze the deposition solution. This embodiment is included in a type for immersing the light-transmissive substrate in a processing bath.

As a second embodiment, a further specific embodiment derived from the above-described first embodiment can be considered, in which (1) a submerged electrode is provided on an internal surface of the processing bath; (2) at least one voltage-application electrode is provided on the internal surface on which the submerged electrode is provided; (3) the light-transmissive substrate is disposed in the processing bath such that the light-transmissive electrode is opposed to said submerged electrode; and (4) said voltage-application electrode is brought into contact with said light-transmissive electrode. This embodiment is featured by disposing a voltage-application electrode on the internal surface of the processing bath on which a submerged electrode is provided, and bringing the voltage-application electrode into contact with the light-transmissive electrode to electrolyze the deposition solution. In this embodiment, the deposition solution is electrolyzed while the light-transmissive electrode on the light-transmissive substrate is set as an anode and the submerged electrode is set as a cathode, and thereby, a color layer adheres onto the light-transmissive electrode. In this case, the submerged electrode may comprise a platinum film, and the light-transmissive electrode may comprise ITO (Indium Tin Oxide).

Further, in a third embodiment, (1) submerged electrodes are provided on a pair of opposing internal surfaces of the processing bath, respectively, (2) at least one voltage-application electrode is provided for each of the internal surfaces of the processing bath on which the submerged electrodes are provided, (3) a plurality of light-transmissive substrates are disposed in the processing bath such that light-transmissive electrodes are opposed to said submerged electrodes; and (4) the voltage-application electrodes are brought into contact with the light-transmissive electrodes, respectively. In this embodiment, submerged electrodes are provided in two or more positions in the processing bath, and voltage-application electrodes are provided so as to correspond to the submerged electrodes, respectively, and a plurality of light-transmissive substrates are immersed in the processing bath such that the light-transmissive electrodes are opposed to the submerged electrodes, respectively.

Also in this embodiment, color layers adhere onto the light-transmissive electrodes by electrolyzing the deposition solution under the condition that the light-transmissive electrodes on the light-transmissive substrates are set as anodes and the submerged electrodes are set as cathodes. According to this embodiment, two or more light-transmissive substrates can be simultaneously provided with color layers. Incidentally, when two light-transmissive substrates are immersed in the processing bath according to this embodiment, the treatment for forming color layers can be performed while disposing the light-transmissive substrates back to back. In this case, these light-transmissive substrates can be stably supported since the light-transmissive electrodes are held in contact with the opposing two voltage-application electrodes.

Moreover, in a fourth embodiment, (1) a voltage-application electrode is disposed so as to penetrate the submerged electrode and a wall of the processing bath; and further, (2) the voltage-application electrode is moved back and forth, namely, in the direction of entering or exiting from the processing bath. By disposing the voltage-application electrode such that it can be moved back and forth relative to the processing bath, the voltage-application electrode can accurately be brought into contact with the light-transmissive electrode, and the light-transmissive substrate can markedly readily be placed in or removed from the deposition solution in the processing bath.

Furthermore, in a fifth embodiment, (1) the submerged electrode is provided on an internal surface of a processing bath which has an opening, the internal surface being opposed to the opening; (2) a deposition solution is placed in the processing bath; (3) a light-transmissive substrate is disposed such that the substrate covers the opening and the light-transmissive electrode faces the inside of the processing bath; and (4) the light-transmissive electrode is brought into contact with the surface of the deposition solution. In this embodiment, the light-transmissive substrate is not immersed in the deposition solution of the processing bath, but made to touch the surface of the deposition solution.

As described above, the light-transmissive electrode can be brought into contact with the deposition solution in a manner of immersing the light-transmissive electrode in the deposition solution, or making the light-transmissive electrode touch the surface of the deposition solution. In a case of making the light-transmissive electrode touch the surface of the deposition solution, the voltage for electrolysis can be applied to the light-transmissive electrode by disposing the voltage-application electrode on a processing-bath internal surface being opposed to the surface of the solution, and bringing the voltage-application electrode into contact with the light-transmissive electrode.

When the manner of making the light-transmissive electrode touch the surface of the deposition solution is employed, a solution-level controller is preferably used for varying the volume of the deposition solution placed in the processing bath. Since the level of the deposition solution can freely be varied by varying the amount of the deposition solution in the processing bath using the solution-level controller, all light-transmissive electrodes can accurately be brought into contact with the deposition solution at a necessary and sufficient volume.

In general, color filters comprise color layers of the three primary colors, namely, R (red), G (green) and B (blue). Accordingly, the method for manufacturing color filters in relation to the present invention is used for forming three types of color layers on a light-transmissive electrode, namely, a color layer which selectively transmits blue light, a color layer which selectively transmits red light, and a color layer which selectively transmits green light. To achieve this, processing baths which contain deposition solutions corresponding to the above-mentioned colors one by one, respectively, are prepared, voltage application only to the light-transmissive electrode corresponding to one of the colors is repeated 3 times while the processing baths are used in order, thus each color layer is formed on the light-transmissive substrate in order.

First Apparatus for Manufacturing Color Filter

The below-illustrated first apparatus for manufacturing color filters in relation to the present invention is of a type in which a color layer is formed on a light-transmissive electrode formed on a light-transmissive substrate, the color layer being capable of transmitting light in a specific wavelength range, wherein the apparatus comprises:

(1) a processing bath containing a deposition solution comprising an electrolytic solution and a pigment material dispersed therein;

(2) a submerged electrode provided on an internal surface of said processing bath; and (3) at least one voltage-application electrode provided on said internal surface of said processing bath on which said submerged electrode is provided. In this apparatus a voltage is applied to the light-transmissive electrode through the voltage-application electrode.

In this manufacturing apparatus, the light-transmissive substrate is immersed in the processing bath while the light-transmissive electrode is disposed so as to be opposed to the submerged electrode, and a voltage is applied to the light-transmissive electrode in this state. Also in this manufacturing apparatus, since the voltage is applied through the contacting portion between the light-transmissive electrode and the deposition solution, namely, through the portion of the light-transmissive electrode submerged in the deposition solution, the color layer can be formed more uniformly in thickness, the thickness can be highly accurately controlled, and further, deposition efficiency relative to the applied electric current can be improved, as compared to a case where voltage is conventionally applied at only one end of the light-transmissive electrode.

As to the first apparatus for manufacturing color filters, the following embodiments can be considered. Initially, in a first embodiment, (1) submerged electrodes are formed on a pair of mutually-opposing internal surfaces of the processing bath, respectively; (2) voltage-application electrodes are provided on said internal surfaces, respectively; and (3) voltage is applied to the light-transmissive substrate through these voltage-application electrodes. According to this embodiment, since a plurality of light-transmissive substrates can be simultaneously treated by immersing them in the processing bath, working efficiency can be improved.

In another embodiment, (1) a voltage-application electrode is disposed so as to penetrate the submerged electrode and a wall of the processing bath; and further, (2) the voltage-application electrode is moved back and forth, namely, in the direction of entering the processing bath or leaving the processing bath. By disposing the voltage-application electrode such that it can be moved back and forth relative to the processing bath, the voltage-application electrode can be accurately brought into contact with the light-transmissive electrode, and the light-transmissive substrate can more readily be placed in or removed from the deposition solution in the processing bath.

Second Apparatus for Manufacturing Color Filter

The below-illustrated second apparatus for manufacturing color filters in relation to the present invention is of a type in which a color layer is formed on a light-transmissive electrode formed on a light-transmissive substrate, the color layer being capable of transmitting light in a specific wavelength range, wherein the apparatus comprises:

(1) a processing bath containing a deposition solution comprising an electrolytic solution and a pigment material dispersed therein, said bath having an opening;

(2) a submerged electrode provided on an internal surface of said processing bath, said surface being opposed to said opening; and (3) at least one voltage-application electrode provided on said internal surface of said processing bath on which said submerged electrode is provided.

Through the voltage-application electrode, a voltage is applied between the submerged electrode and the light-transmissive electrode.

This manufacturing apparatus is different from the above-described first apparatus for manufacturing color filters in that it has an opening in the processing bath and the submerged electrode is disposed on the internal surface of the processing bath being opposed to the opening. In this manufacturing apparatus, the surface of the deposition solution is exposed outward through the opening of the processing bath, and the light-transmissive electrode is brought into contact with the surface of the deposition solution by covering the opening with the light-transmissive substrate. Further, the voltage-application electrode provided on an internal surface of the processing bath is brought into contact with the light-transmissive electrode, and thereby, a voltage is applied to the light-transmissive electrode to electrolyze the deposition solution.

Also in this manufacturing apparatus, since the voltage is applied through the contacting portion between the light-transmissive electrode and the deposition solution, the color layer can be formed more uniformly in thickness, the thickness can be highly accurately controlled, and further, deposition efficiency relative to the applied electric current can be improved, as compared to a case where voltage is conventionally applied at only one end of the light-transmissive electrode.

Second Method for Manufacturing Color Filter

A second method for manufacturing color filters according to the present invention is a method which includes forming, on a light-transmissive electrode formed on a light-transmissive substrate, a color layer transmitting light in a specific wavelength range, wherein the method is characterized by comprising:

(1) placing, in a processing bath, a deposition solution which comprises an electrolytic solution and a pigment material dispersed therein;

(2) disposing a submerged electrode in said deposition solution at a position being opposed to the surface of said deposition solution;

(3) bringing said light-transmissive electrode into contact with the surface of said deposition solution;

(4) disposing a voltage-application electrode so as to be electrically connected to said light-transmissive electrode in a portion other than the contacting portion between the light-transmissive electrode and the surface of said deposition solution; and (5) applying a predetermined voltage between said submerged electrode and said voltage application electrode to electrolyze said deposition solution.

This manufacturing method is different from the aforementioned first method for manufacturing color filters in that the light-transmissive electrode is brought into contact with the surface of the deposition solution instead of immersing it in the deposition solution, and that the voltage for electrolysis is applied to a portion other than the contacting portion instead of applying the voltage to the contacting portion.

According to this manufacturing method, since the voltage for applying electric current to the light-transmissive electrode is applied to the light-transmissive electrode in an portion outside of the contacting portion between the light-transmissive electrode and the surface of the deposition solution, the voltage-application electrode can freely be disposed relative to the light-transmissive substrate in a large area such as the peripheral portion of the substrate or the surface being opposed to the surface on which the light-transmissive electrode is formed. Accordingly, also by this manufacturing method, the color layer can be formed more uniformly in thickness, the thickness can be highly accurately controlled, and further, deposition efficiency relative to the applied electric current can be improved, as compared to a case where voltage is conventionally applied at only one end of the light-transmissive electrode.

Moreover, according to the second method for manufacturing color filters, the following advantages and effects can also be achieved in addition to those described above. In this manufacturing method, the light-transmissive substrate does not need to be immersed in the deposition solution since the color layer is formed by bringing the surface of the deposition solution into contact with one of the surfaces of the light-transmissive substrate, the latter surface being provided with the light-transmissive electrode. It is, therefore, sufficient as a post-treatment washing to wash only the surface provided with the light-transmissive electrode among the surfaces of the light-transmissive substrate. As a result, the washing process after the treatment for forming the color layer can be light and completed within a short time period. Further, since the deposition solution is brought into contact with only the surface provided with the light-transmissive electrode, the amount of the deposition solution taken out from the bath can be reduced. Accordingly, less deposition solution will be consumed, and the ingredients of the deposition solution can be readily managed.

As to the second method for manufacturing color filters, the following embodiments can be considered. In a first embodiment, (1) at the start of the process for forming a color layer, the level of the deposition solution is varied such that the surface of the solution is brought into contact with the light-transmissive electrode; and (2) the level of the deposition solution is varied such that the surface of the solution is separated from the light-transmissive electrode when the process for forming a color layer is completed. According to this embodiment, a necessary and sufficient volume of the deposition solution can be provided for the light-transmissive electrode. Further, since the light-transmissive substrate does not need to be mechanically moved, the operation for starting or ending the process for forming a color layer can be readily carried out, and the mechanical structure for conveying the light-transmissive substrate can be simplified.

Further, in another possible embodiment, a conductive and light-transmissive material is dispersed in the deposition solution, and deposited together with a pigment material on the light-transmissive electrode to form a color layer. According to this embodiment, since the color layer can be conductive, threshold voltage can be reduced when a color filter for a liquid-crystal display unit is formed based on this embodiment, and therefore, sufficient contrast can be secured without deterioration of drive properties.

Third Apparatus for Manufacturing Color Filter

The below-illustrated third apparatus for manufacturing color filters according to the present invention is of a type in which a color layer is formed on a light-transmissive electrode formed on a light-transmissive substrate, the color layer being capable of transmitting light in a specific wavelength range, wherein the apparatus comprises:

(1) a processing bath containing a deposition solution which comprises an electrolytic solution and a pigment material dispersed therein;

(2) a substrate-holding means which holds a light-transmissive substrate such that a light-transmissive electrode on the substrate is in contact with the surface of the deposition solution contained in the processing bath;

(3) a submerged electrode disposed in the processing bath so as to be opposed to the surface of said deposition solution;

(4) a voltage-application electrode disposed so as to be electrically connected to the light-transmissive electrode in a portion other than the contacting portion between the light-transmissive electrode and the surface of the deposition solution; and (5) a power-supply unit which applies a predetermined voltage between said submerged electrode and said voltage-application electrode.

According to this manufacturing apparatus, the above-described second method for manufacturing color filters can surely be carried out.

As to the third apparatus for manufacturing color filters, the following embodiments can be considered. In a first embodiment, a solution-surface-contacting/separating means to move one or both of the light-transmissive substrate and the surface of the deposition solution is further provided in addition to the above-described components. By this means, the light-transmissive substrate can be brought into contact with the surface of the deposition solution, and can be separated from the same. In this case, the solution-surface-contacting/separating means may, for example, have a structure in which the level of the deposition solution is varied up and down.

In another possible embodiment, a drain portion to receive the deposition solution overflowing the processing bath is disposed outside the processing bath. In a color-filter-manufacturing apparatus of a type in which a light-transmissive electrode is brought into contact with the surface of a deposition solution contained in a deposition solution, the manufacturing process can be performed without contacting the light-transmissive substrate to the peripheral portion of the opening of the processing bath by bringing the light-transmissive substrate into contact with the surface of the deposition solution while said surface is raised over the peripheral portion of the processing bath due to the mechanism of surface tension.

In such an apparatus for manufacturing color filters, the deposition solution may overflow the processing bath. According to an embodiment having a drain portion, when the deposition solution overflows the processing bath, it can be recovered through the drain portion. Further, the manufacturing process can also be performed while the surface of the deposition solution is gradually raised and the deposition solution is made to overflow into the drain portion.

Further, in another embodiment, a substrate-conveying means which conveys the light-transmissive substrate toward the upper portion of the processing bath is disposed around the processing bath, and the above-described voltage-application electrode is provided in an appropriate portion in the substrate-conveying means. According to this embodiment, since the voltage-application electrode is provided in the substrate-conveying means itself, the electrically connected portion between the power-supply unit and the light-transmissive substrate does not need to be formed in another portion, and therefore, the apparatus structure can be simplified. Moreover, since no special operation is required to electrically connect the light-transmissive substrate and the power-supply unit, the treatment can be carried out rapidly.

Furthermore, in another embodiment, a substrate-conveying means comprises a conveying roll which horizontally conveys the light-transmissive substrate, and the voltage-application electrode is provided on the surface of the conveying roll. According to this embodiment, since the voltage-application electrode is provided on the surface of the conveying roll, the conductive connection between the voltage-application electrode and the light-transmissive electrode can automatically be achieved when the light-transmissive substrate is conveyed by the conveying roll to the upper portion of the processing bath. As a result, since the treatment process for forming a color layer can be started just after completion of the conveying operation, the treatment can be carried out further rapidly, and in addition, a secure conductive connection between the light-transmissive substrate and the voltage-application electrode can be accomplished.

Incidentally, in each of the above-described methods and apparatuses for manufacturing color filters, and in each of the embodiments in relation thereto, the voltage onto the light-transmissive electrode may be applied through one site or a plurality of sites. Preferably, the voltage should be applied through a plurality of sites since the color layer tends to be thick around the voltage-applied portion and to become thinner relative to the distance from said portion, and irregularities in the thickness of the color layer can be reduced in comparison to the case of applying voltage at one site.

DETAILED DESCRIPTION OF THE PREFERRED EMBODIMENTS

Examples of the methods and the apparatuses for manufacturing color filters according to the present invention will be illustrated below with reference to the attached drawings. Although the below-illustrated examples are included in cases where a color filter is formed on a transparent substrate used for a liquid-crystal display unit, the present invention is not limited to such cases and can also be widely applied to cases where various color filters used for purposes other than liquid-crystal display units are manufactured.

EXAMPLE 1

Figure 1:
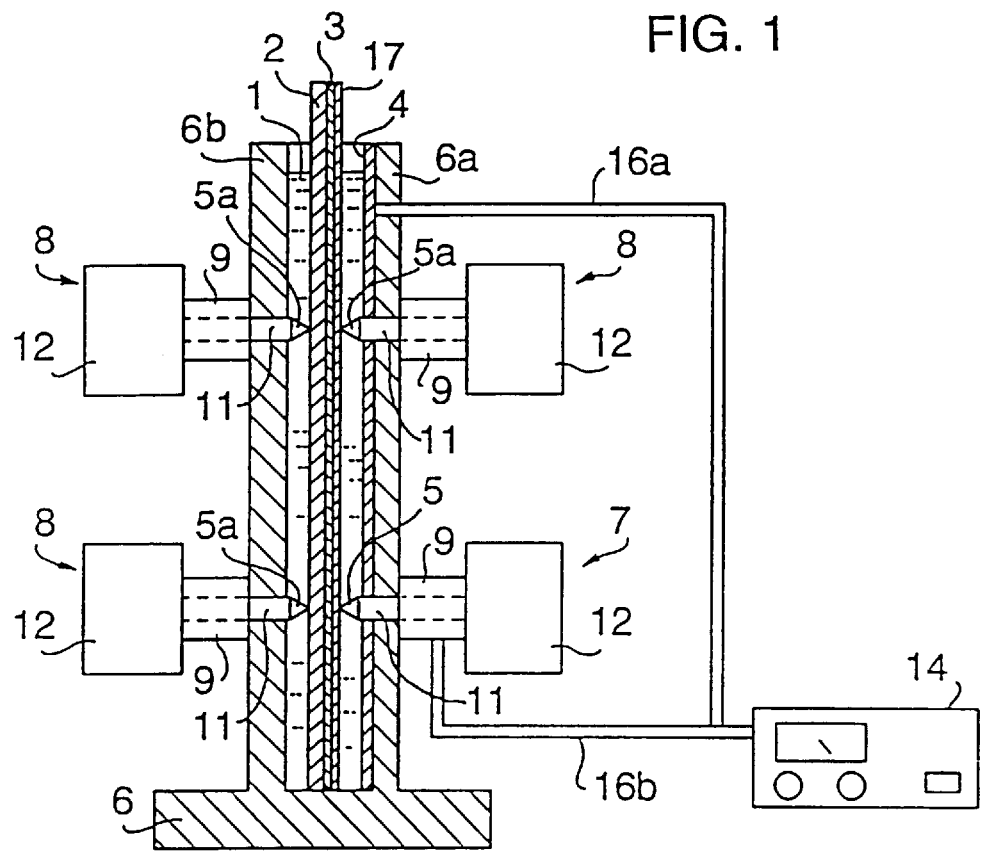
FIG. 1 is a sectional view showing the apparatus of Example 1 for carrying out a method for manufacturing color filters according to the present invention.

FIG. 1 shows an example apparatus for carrying out a method for manufacturing color filters according to the present invention. This apparatus comprises a processing bath 6 containing a deposition solution 1; a submerged electrode 4 provided on the internal surface of one bath wall 6a of the processing bath 6; a plurality of voltage-application units 7 provided for the bath wall 6a; and a plurality of substrate-supporting units 8 provided for the bath wall 6a and another bath wall 6b opposite thereto.

The submerged electrode 4 is electrically connected to a plus-voltage-application line 16a extended from a voltage controller 14. Further, a plurality of voltage-application units 7 or substrate-supporting units 8 are disposed for each sectional position in the direction perpendicular to the drawing sheet although only the most front ones are shown in FIG. 1 while the hinder ones are hidden by the most front ones. Incidentally, the voltage-application units 7 and the substrate-supporting units 8 may be disposed such that the heightwise positions of the front ones relative to the bath walls are different from those of the hinder ones.

Figure 2:
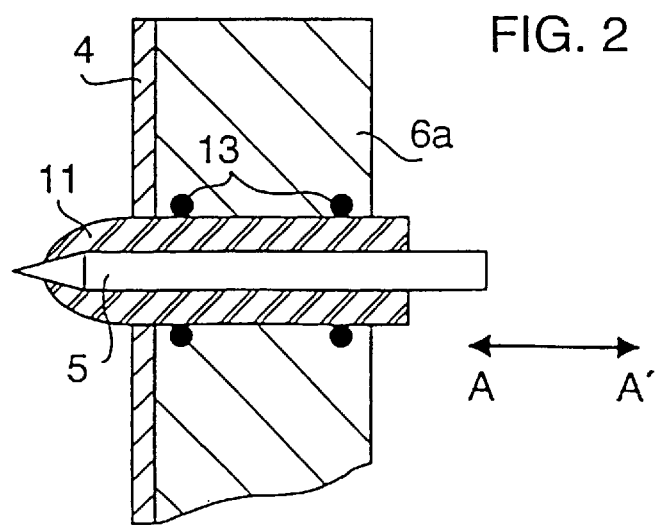
FIG. 2 is a sectional view showing the principal part of FIG. 1.

Each voltage-application unit 7 comprises a holding portion 9 fixed to the bath wall 6a; a slider 11 which is supported by the holding portion 9 and is capable of moving right and left; and a cylinder actuator 12 which is fixed to the right end of the holding portion 9 and drives the slider 11. As shown in FIG. 2, a voltage-application electrode 5 is carried in the slider 11. This voltage-application electrode 5 is immovably fixed relative to the slider 11. Incidentally, the numeral 13 indicates a ring-shaped sealing member for prevention of solution leakage. As shown in FIG. 1, the voltage-application electrode 5 is electrically connected to a minus-voltage-application line 16b which is extended from the voltage controller 14.

The substrate-supporting units 8 have the same structure as that of the voltage-application units 7 except that supporting members 5a corresponding the voltage-application electrodes 5 are not connected to the minus-voltage-application line 16b. In other words, although the supporting members 5a are formed in the same shape as the voltage-application electrodes 5, they do not serve as electrodes but are used for supporting a transparent substrate 2. Incidentally, the components which constitute the substrate-supporting units 8 but are other than the supporting members 5a can be the same-as those of the voltage-application units 7, and therefore, the same components are indicated with the same numerals.

Next, operation of the above-constructed apparatus for manufacturing color filters will be illustrated. In this example, the object on which a color filter was formed using this apparatus was a transparent substrate of a liquid-crystal display unit.

Figure 3:
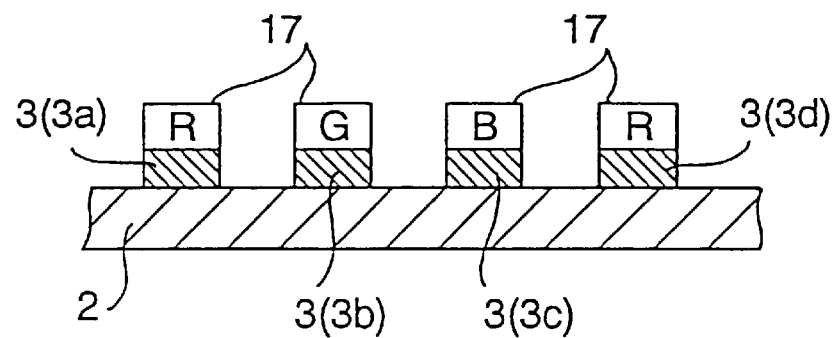
FIG. 3 is a sectional view showing an example color filter used in a liquid-crystal display unit.

Initially, as shown in FIG. 3, a transparent glass substrate 2 (7079 manufactured by Corning Inc.) was prepared as a light-transmissive substrate. On the transparent substrate 2, an ITO film having a 1000 Å thickness was formed by sputtering, and subjected to photolithography and etching to form light-transmissive electrodes having predetermined patterns, which were strip-shaped transparent electrodes 3 in this example. These transparent electrodes 3 constituted pixel electrodes of the liquid-crystal display unit.

The apparatus of this example for manufacturing color filters was used for forming color layers 17 on the transparent electrodes 3. Incidentally, the characters R, G, and B in FIG. 3 indicate color layers which selectively transmit light beams of red, green and blue, respectively.

Referring to FIG. 1, a deposition solution 1 was initially placed in the processing bath 6. Each deposition solution 1 used in this example was a Micelle-colloid dispersion obtained by mixing an organic pigment material and hydrophobic ITO particles in a medium containing an electrolyte and a surfactant having redox reactivity, and dispersing the organic pigment material and the hydrophobic ITO particles using a ultrasonic homogenizer.

The following three compositions which correspond to the colors of the below-formed color layers 17, respectively, were prepared as deposition solutions 1.

(1) Deposition Solution for Red (R) Color Layer (A) Organic Pigment Material (a mixture of an anthraquinone-type (red) pigment:an azo-type (yellow) pigment=9:1) . . . 6 g/liter (B) Hydrophobic ITO Particles (ITO particles of an average particle diameter of 300 to 400 Å processed to be hydrophobic; manufactured by Sumitomo Metal Mining Co., Ltd.) . . . 1.8 g/liter (C) Surfactant (Ferrocenyl PEG; manufactured by Dojindo Laboratories) . . . 2.2 g/liter (D) Supporting Electrolyte LiBr . . . 4 g/liter (2) Deposition Solution for Green (G) Color Layer (A) Organic Pigment Material (a mixture of a phthalocyanine-green-type (green) pigment:an azo-type (yellow) pigment=8:2) . . . 10 g/liter (B) Hydrophobic ITO Particles (ITO particles of an average particle diameter of 300 to 400 Å processed to be hydrophobic; manufactured by Sumitomo Metal Mining Co., Ltd.) . . . 3 g/liter (C) Surfactant (Ferrocenyl PEG; manufactured by Dojindo Laboratories) . . . 2.2 g/liter (D) Supporting Electrolyte LiBr . . . 4 g/liter (3) Deposition Solution for Blue (B) Color Layer (A) Organic Pigment Material (a mixture of a phthalocyanine-type (blue) pigment:an azo-type (yellow) pigment=9:1) . . . 10 g/liter (B) Hydrophobic ITO Particles (ITO particles of an average particle diameter of 300 to 400 Å processed to be hydrophobic; manufactured by Sumitomo Metal Mining Co., Ltd.) . . . 3 g/liter (C) Surfactant (Ferrocenyl PEG; manufactured by Dojindo Laboratories) . . . 2.2 g/liter (D) Supporting Electrolyte LiBr . . . 4 g/liter Incidentally, various publicly-known pigments can be used solely or in combination as pigments for the color layers based on their colors. Further, the hydrophobic ITO particles can be obtained by introducing functional groups to the particle surfaces through plasma treatment, ultraviolet treatment or the like, and reacting the functional groups with a coupling agent or a hydrophobic monomer. Any particles such as tin oxide particles can be used instead of the hydrophobic ITO particles so long as they are hydrophobic, light-transmissive and conductive particles. Moreover, various compositions can be used as the surfactant for dispersing the pigment material and other ingredients at an appropriate concentration adjusted depending on the type of pigment, transparent conductive particles and others. Additionally, various electrolytes can be used without any special limitation at a concentration ordinarily adjusted to approximately 0.005 to 0.2 M.

Alternatively, each deposition solution can be prepared by dispersing only a pigment material in an electrolytic solution without addition of transparent conductive particles such as ITO particles in the deposition solution, and each color layer can be formed using the thus prepared deposition solution.

Reverting to the subject referring to FIG. 1, the deposition solution 1 for red was placed in the processing bath 6 for depositing a red color layer. Succeedingly, the transparent substrate 2 having the transparent electrodes 3 thereon was inserted in the processing bath while the transparent electrodes 3 were opposed to the submerged electrode 4, and thus the transparent substrate 2 was immersed in the deposition solution 1.

Subsequently, the sliders 11 were linearly moved toward the inside of the processing bath 6 by operating cylinder actuators 12 in the voltage-application units 7 and the substrate-supporting units 8. As a result, the tips of the supporting members 5a in the substrate-supporting units 8 and those of the voltage-application electrodes 5 in the voltage-application units 7 came into contact with the surface of the transparent substrate 2 having the transparent electrode 3, and with the reverse surface of the transparent substrate 2. According to this manner, the transparent substrate 2 was securely supported in a predetermined position, and further, the voltage-application electrodes 5 were electrically connected with the transparent electrodes 3.

Succeedingly, the deposition solution 1 was electrolyzed while the submerged electrode 4 was used as a cathode, the transparent electrodes 3 were used as anodes, and voltage was applied only to the transparent electrodes 3a, 3d, and others on which red color layers 17R (see FIG. 3) should be formed. According to this electrolysis, red color layers 17R were formed on the transparent electrodes 3a, 3d, and others each requiring a red color layer. Incidentally, the voltage applied for the electrolysis was 0.5 V, and the time period for voltage application was 20 min.

Next, the above-prepared deposition solution 1 for green was placed in the processing bath 6 instead of the deposition solution 1 for red, and the transparent substrate 2 on which the red color layers 17R had been formed was immersed in the deposition solution 1 such that the transparent electrodes 3 were opposed to the submerged electrode 4. Then, the supporting members 5a in the substrate-supporting units 8 were brought into contact with the surface of the transparent substrate 2, said surface having the transparent electrodes 3 thereon, and with the reverse surface, respectively. Further, the voltage-application electrodes 5 in the voltage-application units 7 were brought into contact with the transparent electrodes 3.

Succeedingly, the deposition solution 1 was electrolyzed while the submerged electrode 4 was used as a cathode, the transparent electrodes 3 were used as anodes, and voltage was applied only to the transparent electrodes 3b and others on which green color layers 17G should be formed. According to this electrolysis, green color layers 17G were obtained. Incidentally, the voltage applied for the electrolysis was 0.5 V, and the time period for voltage application was 10 min.

Next, the above-prepared deposition solution 1 for blue was placed in the processing bath 6 instead of the deposition solution 1 for green, and the transparent substrate 2 on which the red color layers 17R and the green color layers 17G had been formed was immersed in the deposition solution 1 such that the transparent electrodes 3 were opposed to the submerged electrode 4. Then, the supporting members 5a in the substrate-supporting units 8 were brought into contact with the surface of the transparent substrate 2, said surface having the transparent electrodes thereon, and with the reverse surface, respectively. Further, the voltage-application electrodes 5 in the voltage-application units 7 were brought into contact with the transparent electrodes 3.

Succeedingly, the deposition solution 1 was electrolyzed while the submerged electrode 4 was used as a cathode, the transparent electrodes 3 were used as anodes, and voltage was applied only to the transparent electrodes 3c and others on which blue color layers 17B should be formed. According to this electrolysis, the blue color layers 17B were obtained. Incidentally, the voltage applied for the electrolysis was 0.5 V, and the time period for voltage application was 7 min.

In this example, deposition of the color layers was carried out in the order of red, green and blue, as described above. The order of deposition is not limited to this, and the color layers can be formed in any order.

As described above, in this example, since voltage was applied through the submerged portions of the transparent electrodes 3 in the deposition solution 1, namely, through the contacting portions between the transparent electrodes 3 and the deposition solution 1, the color layers 17 could be formed more uniformly in thickness, the thicknesses could be highly accurately controlled, and further, deposition efficiencies relative to the applied electric current could be improved, as compared to a case where voltage is conventionally applied at only one end of each transparent electrode. Further, the liquid-crystal display unit satisfied the same level of display properties as that in a case where transparent electrodes are deposited on a color filter.

EXAMPLE 2

Figure 4:
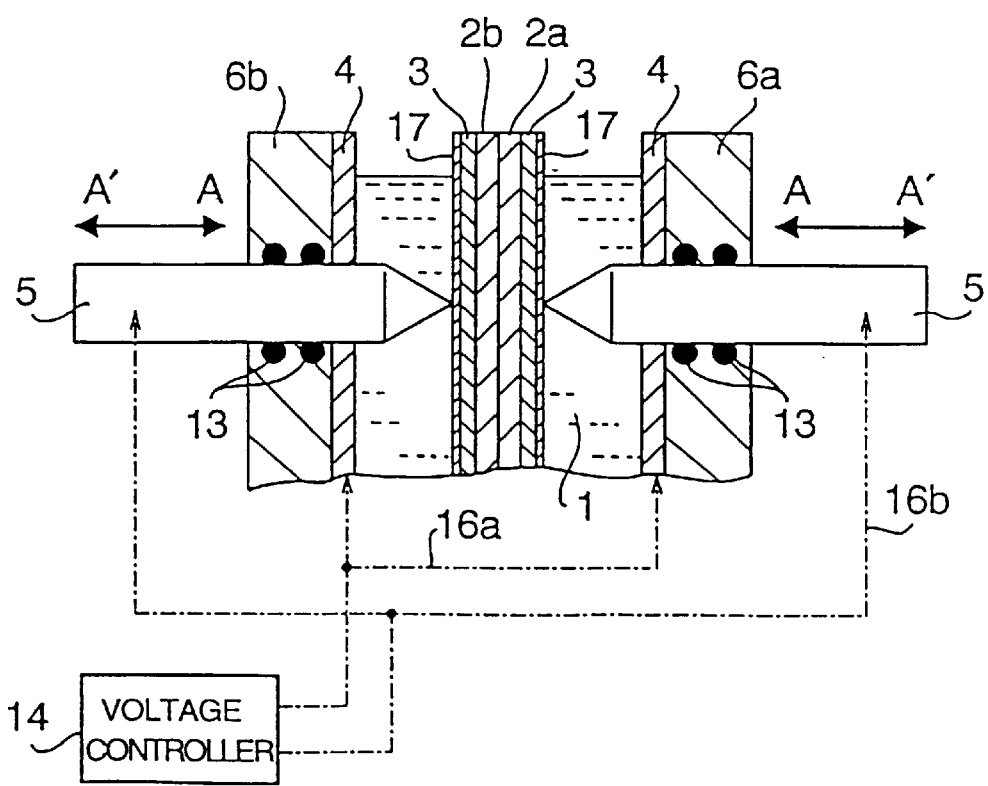
FIG. 4 is a sectional view showing the principal part of the apparatus of Example 2 for carrying out a method for manufacturing color filters according to the present invention.

FIG. 4 shows the principal portion of the apparatus of Example 2 for carrying out a method for manufacturing color filters according to the present invention. This example is different from Example 1 illustrated with reference to FIG. 1 in that:

(1) both mutually-opposing bath walls 6a and 6b of the processing bath 6 have submerged electrodes 4 on their internal surfaces, respectively;

(2) both bath walls 6a and 6b are provided with voltage-application electrodes 5, respectively, and these electrodes are electrically connected to the minus-voltage-application line 16b which is extended from the voltage controller 14; and (3) the voltage-application electrodes 5 are directly fitted to the bath walls 6a and 6b without intervening members such as the sliders 11 (see FIG. 2), and these electrodes are made to be capable of sliding relative to the bath walls 6a or 6b in the directions as indicated with the double-headed arrow A—A'.

In the manufacture of color filters using this example apparatus thus constructed, two transparent substrates 2a and 2b were disposed back to back such that each surface having transparent electrodes 3 faces outward, and thus disposed transparent substrates 2a and 2b were immersed in the deposition solution 1. As a result of immersion, the transparent electrodes 3 on the transparent substrates 2a and 2b were opposed to the submerged electrodes 4, respectively. After this, color layers 17 each having a color of red, green, or blue were formed on the transparent electrodes 3, respectively, under the same conditions and according to the same process as in Example 1 illustrated with reference to FIG. 1.

Also in this example, since voltage was applied through the portions of the transparent electrodes 3 submerged in the deposition solution 1, namely, through the contacting portions between the transparent electrodes 3 and the deposition solution 1, the color layers 17 could be formed uniformly in thickness, the thicknesses could be highly accurately controlled, and further, deposition efficiencies relative to the applied electric current could be improved.

Furthermore, in this structure, both mutually-opposing surfaces had voltage-application electrodes 5 which could be moved to come into contact with the transparent electrodes 3, respectively, and therefore, the two transparent substrates 2a and 2b could simultaneously be provided with the color layers 17, respectively. As a result, color filter productivity could be improved.

EXAMPLE 3

Figure 5:
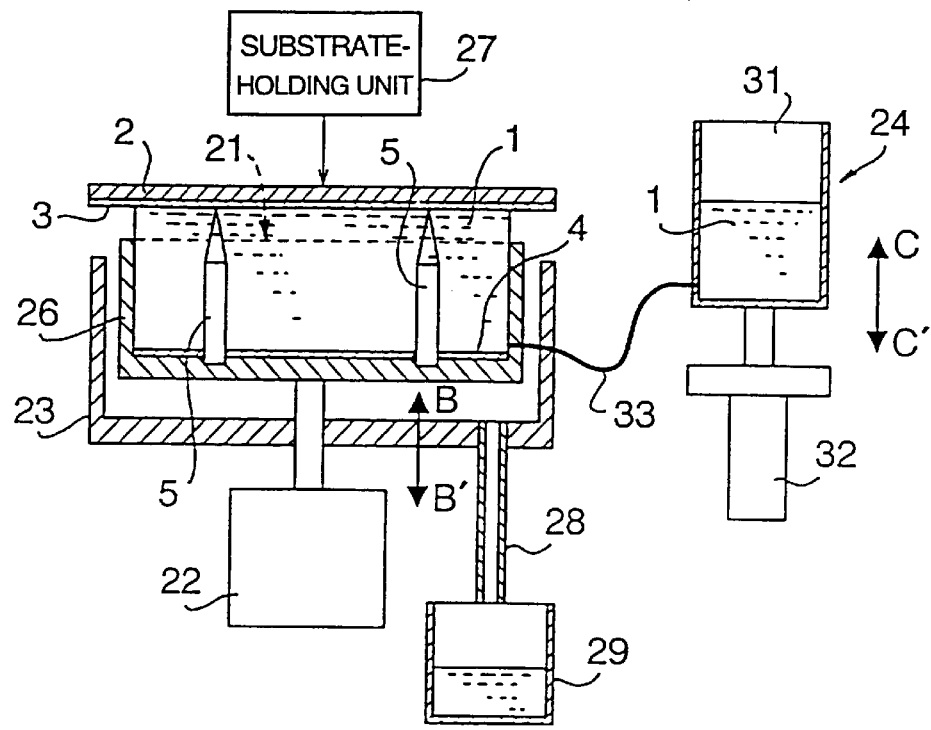
FIG. 5 is a sectional view showing the apparatus of Example 3 for carrying out a method for manufacturing color filters according to the present invention.

FIG. 5 shows the apparatus of Example 3 for carrying out a method for manufacturing color filters according to the present invention. This apparatus for manufacturing color filters comprises a processing bath 26 which has an opening 21 and contains a deposition solution 1; a level-controlling motor 22 which moves the processing bath 26 up and down as indicated with the double-headed arrow B—B'; a solution-recovering bath 23 disposed so as to surround the processing bath 26; a solution-surface-contacting/separating unit 24 which causes upward and downward parallel translations of the surface of the deposition solution 1 in the processing bath 26; and a substrate-holding unit 27 which holds a transparent substrate 2 at a predetermined position above the processing bath 26.

A submerged electrode 4 such as of a platinum film is formed on the bottom surface of the processing bath 26, namely, the internal surface opposite to the opening 21, and a plurality of voltage-application electrodes 5 are also fixed to the bottom surface. The tips of these voltage-application electrodes 5 are extended to a level slightly higher than the opening 21. Further, a drain pipe 28 is connected to the bottom of the solution-recovering bath 23, and a drain vessel 29 is disposed at the outlet of the drain pipe 28. A predetermined voltage is applied between the submerged electrode 4 and the voltage-application electrodes 5 according to the operation of non-illustrated voltage controller.

The aforementioned solution-surface-contacting/separating unit 24 includes a deposition-solution vessel 31 containing the deposition solution 1, and a level-controlling motor 32 which moves the vessel 31 up and down as indicated with the double-headed arrow C—C'. The deposition-solution vessel 31 is connected to the processing bath 26 through a communication hose 33.

The apparatus of this example for manufacturing color filters was thus constructed. Accordingly, in the process of forming color layers on transparent electrodes 3 formed on the transparent substrate 2, the substrate 2 was initially held by the substrate-holding unit 27 and disposed at a predetermined position above the opening 21 of the processing bath 26 while the transparent electrodes 3 were maintained to face the processing bath 26.

Next, the level-controlling motor 22 was put into operation to translate the processing bath 26 toward the substrate 2 as indicated with the arrowhead B, and the tips of the voltage-application electrodes 5 in the processing bath 26 were thereby brought into contact with the transparent electrodes 3. After this, the level-controlling motor 32 was put into operation to lift the deposition-solution vessel 31, as indicated with the arrowhead C. Then, the deposition solution 1 in the deposition-solution vessel 31 was fed into the processing bath 26 through the communication hose 33, and as a result, the surface of the deposition solution 1 in the processing bath 26 was raised to come into contact with the transparent electrodes 3. Hereupon, when the deposition solution 1 spills out of the processing bath, the spilt deposition solution 1 drops into the solution-recovering bath 23, and is collected into the drain vessel 29 through the drain pipe 28.

After that, voltage from the non-illustrated voltage controller was applied to the contacting interfaces between the deposition solution 1 and the transparent electrodes 3 through the voltage-application electrodes 5, and the deposition solution 1 was thereby electrolyzed. Such an electrolytic process was repeated in relation to the colors of red, green, and blue, respectively. As a result, the color layers were formed on the transparent electrodes 3, respectively, and thus a color filter was manufactured.

Also in this example, since voltage was applied through the contacting portions between the transparent electrodes 3 and the surface of the deposition solution 1, the color layers could be formed uniformly in thickness, the thicknesses could be highly accurately controlled, and further, deposition efficiencies relative to the applied electric current could be improved. Further, according to this example, another effect can be obtained, namely, the surface of the transparent substrate 2 on which the transparent electrodes 3 are not formed is not smudged with the deposition solution 1. Moreover, since the transparent substrate 2 does not need to be immersed in the deposition solution 1, the deposition treatment can easily be automatically performed.

EXAMPLE 4

Figure 6:
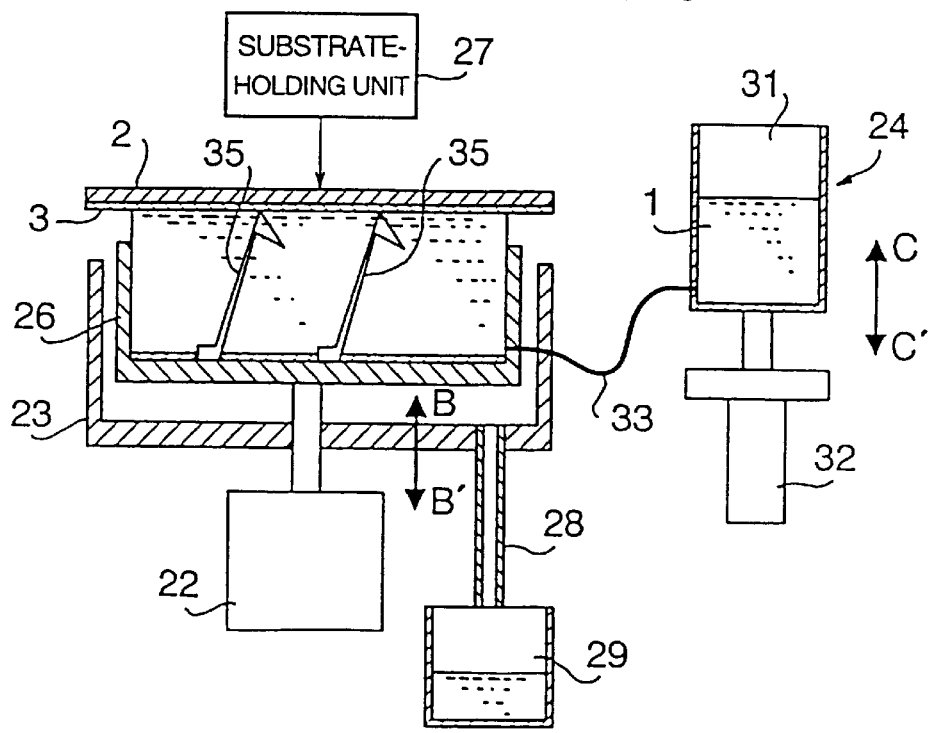
FIG. 6 is a sectional view showing the apparatus of Example 4 for carrying out a method for manufacturing color filters according to the present invention.

FIG. 6 shows the apparatus of Example 4 for carrying out a method for manufacturing color filters according to the present invention. This apparatus for manufacturing color filters has almost the same structure as the example shown in FIG. 5 except that voltage-application electrodes 35 are fixed to the bottom of the processing bath 26 with an elastic and conductive material, such as a spring material, instead of the highly rigid voltage-application electrodes 5 (see FIG. 5). Since the other structural members may be the same as those of the example shown in FIG. 5, the members are indicated using the same numerals, and the description for such members is omitted.

According to this example, stable conductive connections can be achieved between the voltage-application electrodes 35 and the transparent electrodes 3, and the transparent electrodes 3 are less scratched by the electrodes 35.

EXAMPLE 5

Figure 7:
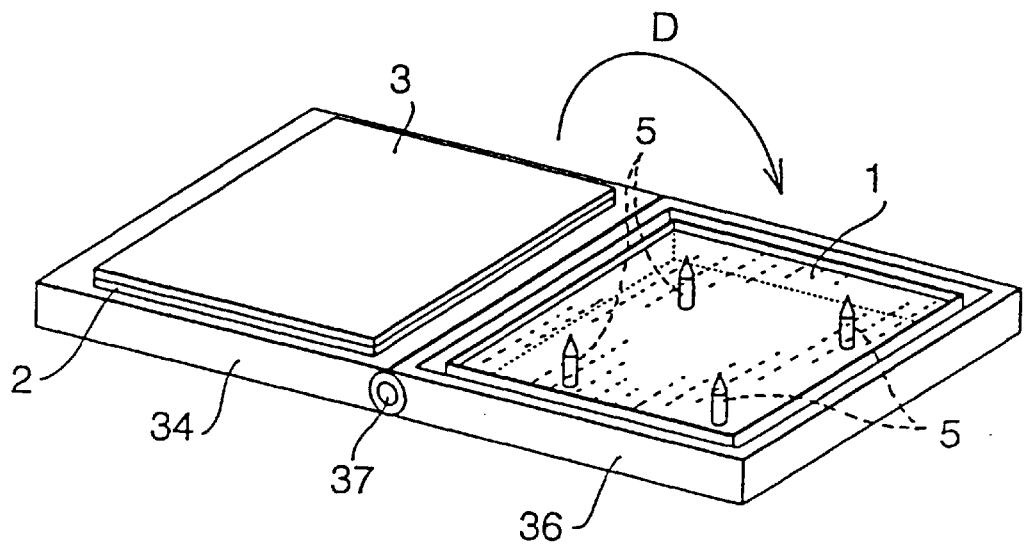
FIG. 7 is a perspective view showing the apparatus of Example 5 for carrying out a method for manufacturing color filters according to the present invention.

FIG. 7 shows the apparatus of Example 5 for carrying out a method for manufacturing color filters according to the present invention. This apparatus for manufacturing color filters comprises a processing bath 36 containing a deposition solution 1; and a table 34 which is supported by a hinge portion 37 so as to be rotatable relative to the processing bath 36, and which holds a transparent substrate 2.

Figure 8:
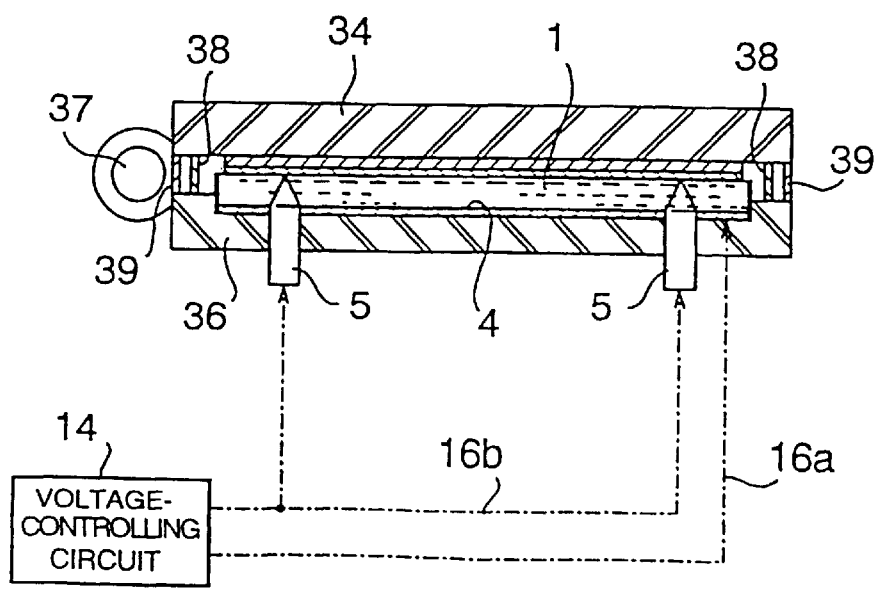
FIG. 8 is a sectional view showing the sectional structure of the apparatus shown in FIG. 7.
Figure 9:
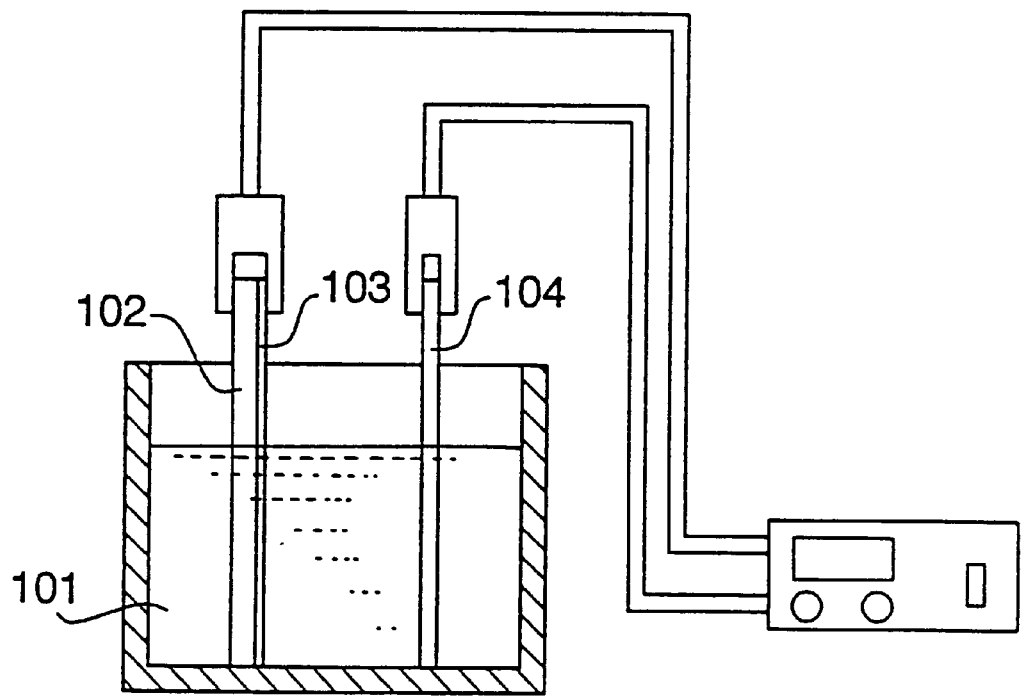
FIG. 9 is a sectional view showing an example of a conventional apparatus for manufacturing color filters.

As shown in FIG. 8, a submerged electrode 4 is formed, for example with a platinum film, on the bottom surface of the processing bath 36, and a plurality of voltage-application electrodes 5 are disposed so as to penetrate the submerged electrode 4 and the bottom of the processing bath 36. Additionally, an inner rubber shield 38 is disposed so as to surround the outer periphery of the processing bath 36, and an outer rubber shield 39 is further disposed around the inner rubber shield. These rubber shields 38 and 39 may be formed with an elastic material such as fluoro-rubber.

The apparatus of this example was thus constructed. Accordingly, a transparent substrate 2 was placed on the substrate-holding table 34 while transparent electrodes 3 were made to face upward. Next, the table 34 was rotated around the hinge portion 37 such that the transparent substrate 2 on the table was moved to a position above the processing bath 36. According to this manner, the transparent electrodes 3 on the transparent substrate 2 came into contact with the surface of the deposition solution 1, and the tips of the voltage-application electrodes 5 came into contact with the transparent electrodes 3.

After this, voltage was applied to the transparent electrodes 3 at the portions in contact with the surface of the deposition solution 1 through the voltage-application electrodes 5 to electrolyze the deposition solution 1, and thereby, color layers were formed on the transparent electrodes 3.

EXAMPLE 6

Figure 10:
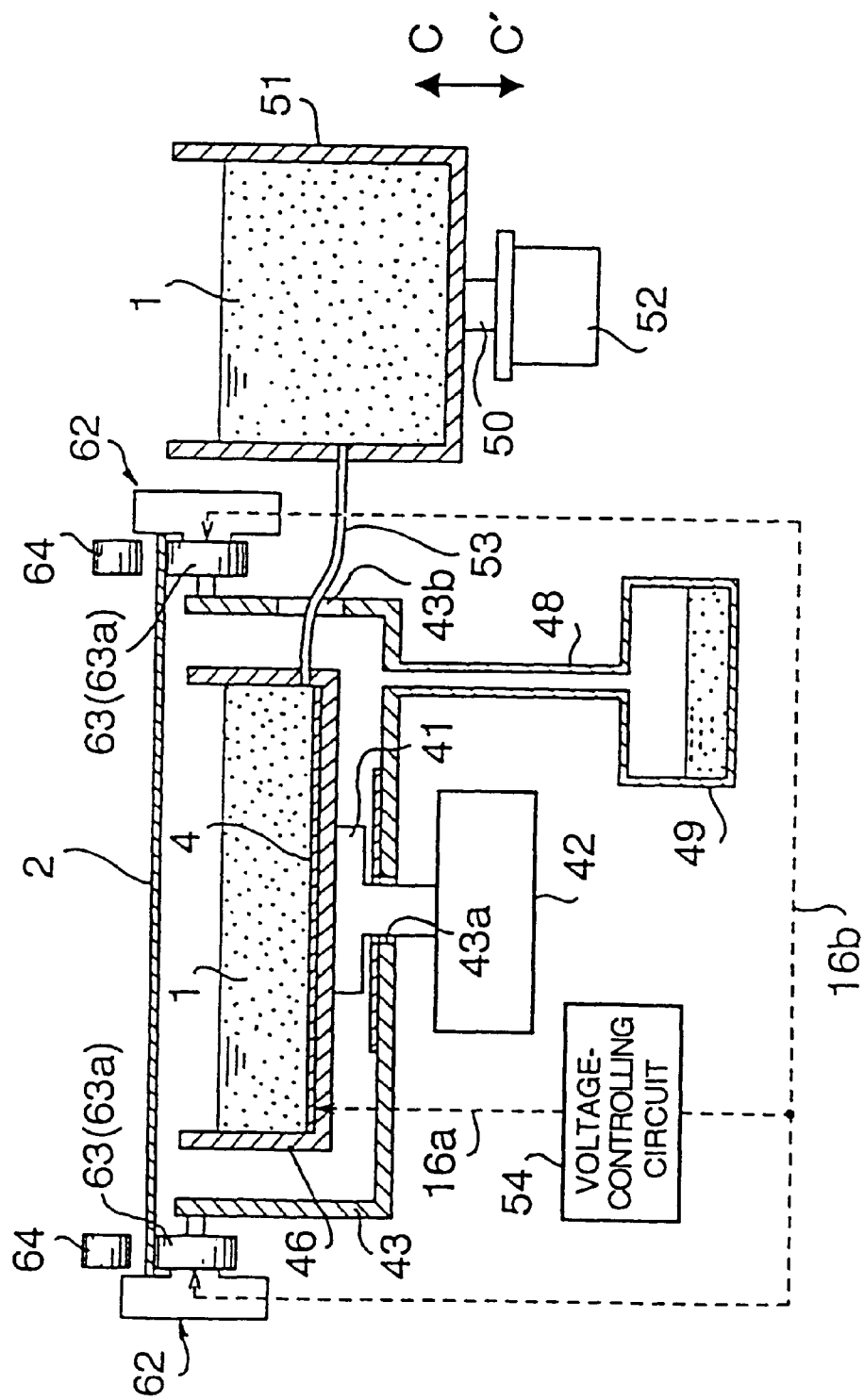
FIG. 10 is a sectional view showing the apparatus of Example 6 for carrying out a method for manufacturing color filters according to the present invention.

FIG. 10 shows the apparatus of Example 6 for carrying out a method for manufacturing color filters according to the present invention. This apparatus comprises a processing bath 46 containing a deposition solution 1, and a level-controlling motor 42 which is connected to a supporting shaft 41 extended from the bottom of the processing bath 46. The level-controlling motor 42 adjusts the position of the processing bath 46 up and down by making the supporting shaft 41 ascend or descend.

The processing bath 46 is contained in a solution-recovering bath 43 formed in a larger size. This solution-recovering bath 43 has a through hole 43a for penetration of the aforementioned supporting shaft 41, and a side hole 43b for passing a communication pipe 53. Additionally, a submerged electrode 4 formed, for example, with a platinum film, is disposed on the bottom surface of the processing bath 46.

The solution-recovering bath 43 is fixed to a non-illustrated stand, and the aforementioned processing bath 46 is supported in the solution-recovering bath 43 so as to be movable up and down. A drain pipe 48 is connected to the bottom of the solution-recovering bath 43, and the outlet of the drain pipe 48 is connected to a drain vessel 49. The communication pipe 53 extended from the processing bath 46 is led outside through the side hole 43b of the aforementioned solution-recovering bath 43, and connected to a deposition-solution vessel 51 disposed near by. This deposition-solution vessel 51 is connected to a level-controlling motor 52 through a supporting shaft 50, and is moved up and down as indicated by the double-headed arrow C—C' according to operation of the motor 52.

Substrate-conveying units 62 are provided for both side faces of the solution-recovering bath 43, respectively, wherein each said unit contains a plurality of conveying rolls 63 arranged in the direction perpendicular to the drawing sheet. Among a plurality of these conveying rolls 63, the conveying rolls 63 disposed near and along either side wall of the processing bath 46 are coated with roll electrodes 63a which have a cylindric shape and serve as voltage-application electrodes. Each of these roll electrodes 63a is equipped with a plurality of electrode terminals which are brought into contact with electrode pads formed at the end portions of the reverse surface (the lower surface in FIG. 10) of the transparent substrate 2. Further, as occasion demands, a plurality of roll electrodes 63a may be arranged in the direction perpendicular to the drawing sheet such that they can come into contact with the electrode pads in the transparent substrate 2 placed on the processing bath 46, respectively.

The transparent substrate 2 to be used in a liquid-crystal display unit is conveyed in the direction perpendicular to the drawing sheet by the conveying rolls 63 in the substrate-conveying units 62. On the reverse surface (the lower surface in FIG. 10) of the transparent substrate 2, transparent electrodes having predetermined patterns have been formed in a preceding process. Additionally, a plurality of electrode pads to be electrically connected to the transparent electrodes are formed at both end portions of the transparent substrate 2, respectively.

Presser members 64 are disposed above the roll electrodes 63a arranged at both side faces of the processing bath 46 so as to be movable up and down. After the conveyed transparent substrate 2 is positioned above the processing bath 46, the presser members 64 are brought down from upper positions to press both the end portions of the transparent substrate 2 onto the roll electrodes 63a, and thus the transparent substrate 2 is immobilized.

The roll electrodes 63a and the submerged electrode 4 formed in the processing bath 46 are connected to a voltage-controlling circuit 54. This voltage-controlling circuit 54 supplies a plus voltage for the roll electrodes 63a, and a minus voltage for the submerged electrode 4.

Figure 12:
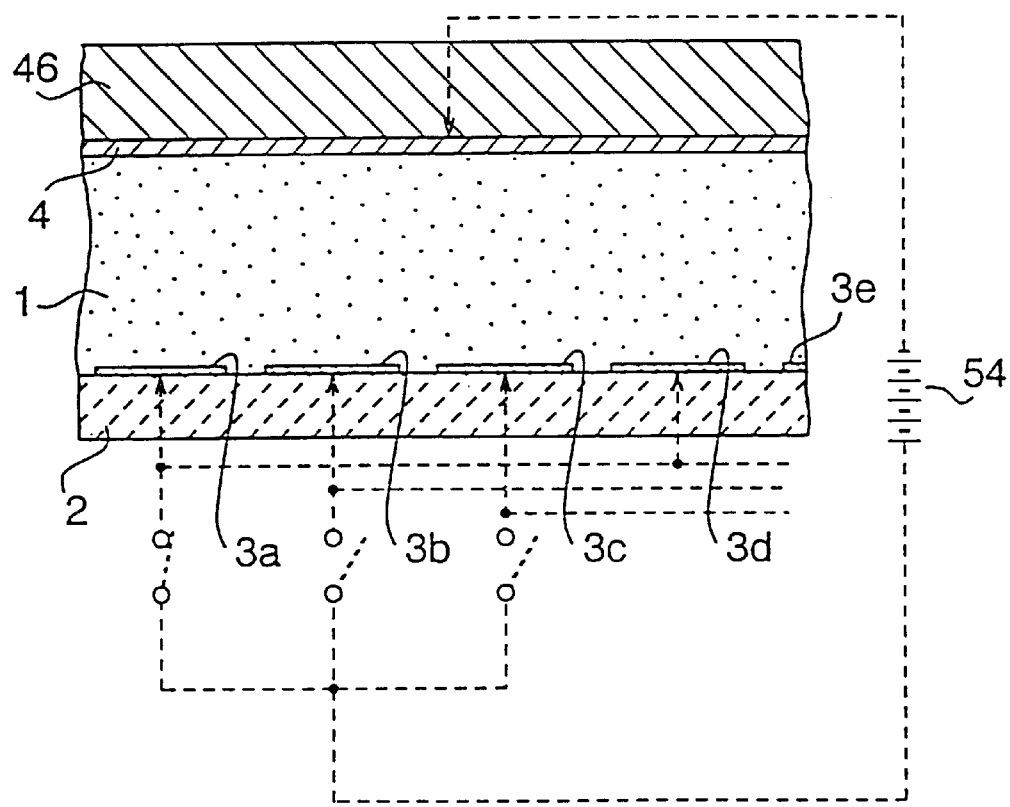
FIG. 12 is a sectional view for explaining the situation of voltage-application in the apparatus shown in FIG. 10.

The operation of the above-constructed apparatus for manufacturing color filters will be illustrated below. As shown in FIG. 12, ITO is applied by sputtering to a surface of the transparent substrate 2 which should be treated in this process, and photolithography and etching are performed to form transparent electrodes 3a, 3b, 3c, 3d, 3e, . . . which have thicknesses of approximately 1000 Å and predetermined patterns. In this example, each of these transparent electrodes 3a, 3b, 3c, 3d, 3e, . . . is formed so as to have a strip-shaped pattern extended in the direction perpendicular to the drawing sheet.

Referring to FIG. 10, any one of among three deposition solutions 1, i.e., red, green and blue is placed in the processing bath 46 and the deposition-solution vessel 51 at predetermined volumes, and the level of the processing bath 46 is adjusted by the level-controlling motor 42 to the level for performing treatment.

Figure 11:
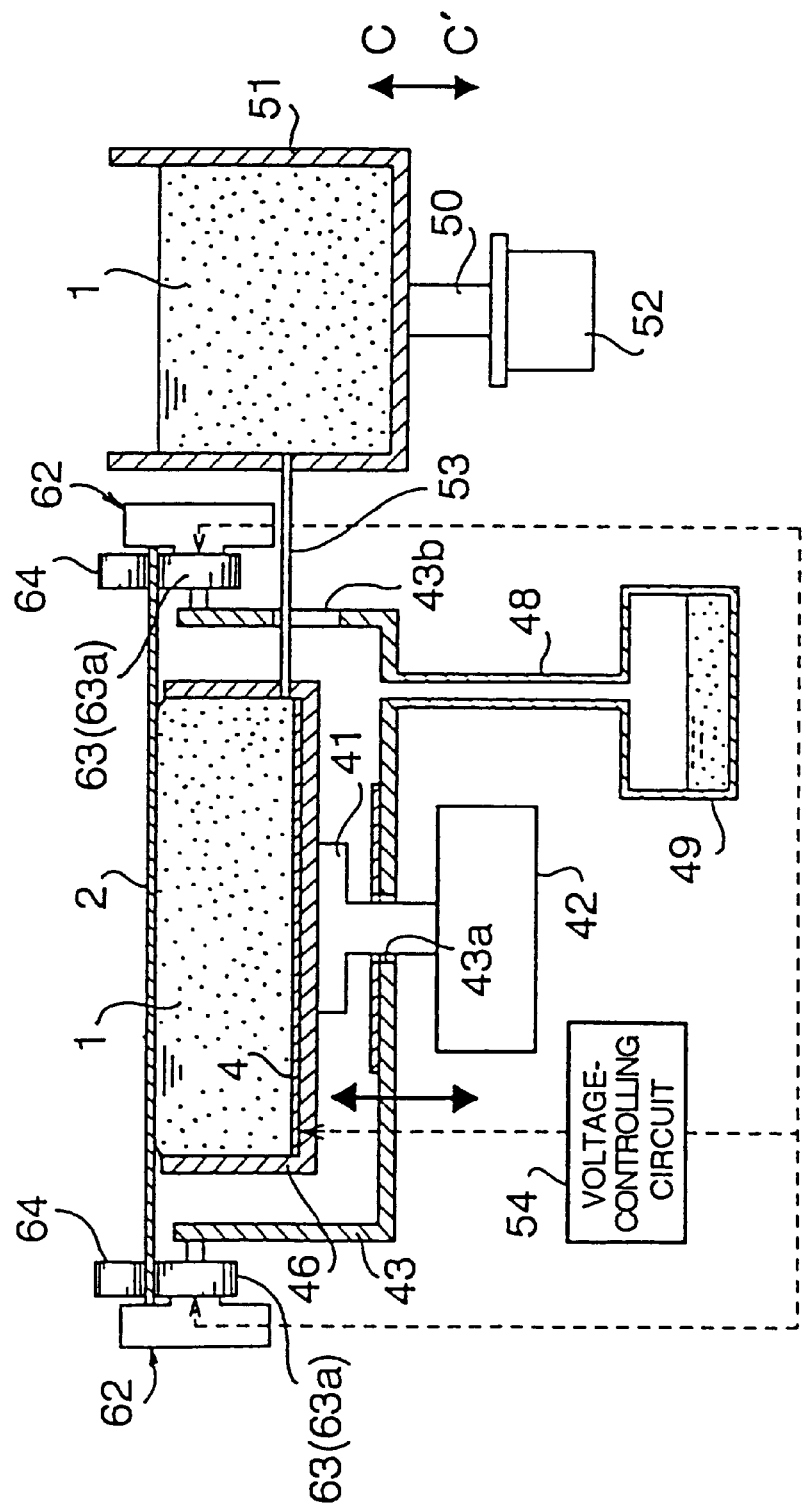
FIG. 11 is a sectional view showing the apparatus shown in FIG. 10 in operation.

Specifically, as shown in FIG. 11, the level of the processing bath 46 for performing the treatment is adjusted so as to satisfy the following: The reverse surface of the transparent substrate 2 conveyed by the substrate-conveying units 62, namely, the surface having the transparent electrodes 3, can be in contact with the surface of the deposition solution 1 which is slightly over the opening brim of the processing bath 46 due to surface tension when the processing bath 46 is fully filled with the deposition solution 1; and the reverse surface never comes into contact with the opening brim of the processing bath 46.

Next, previous to the start of the treatment, the processing bath 46 and the deposition-solution vessel 51 are lowered as shown in FIG. 10 so that the solution level in the processing bath 46 is lower than the opening brim. The transparent substrate 2 is then conveyed by the substrate-conveying units 62, and stopped at a position above the processing bath 46. Subsequently, the presser members 64 are brought down to achieve stable contact between the electrode pads of the transparent substrate 2 and the roll electrodes 63a of the conveying rolls 63, and simultaneously, the transparent substrate 2 is immobilized at a position above the processing bath 46.

Next, the processing bath 46 is lifted to a predetermined level and held there, and the deposition-solution vessel 51 is then elevated by the level-controlling motor 52 such that the processing bath 46 is fully filled with the deposition solution 1, as shown in FIG. 11. The degree of elevating the deposition-solution vessel 51 may be predetermined beforehand. Alternatively, the deposition-solution vessel 51 may be slowly elevated, and the elevation of the deposition-solution vessel 51 may be stopped at the time when contact between the transparent electrodes formed on the transparent substrate 2 and the surface of the deposition solution 1 is detected by the voltage-controlling circuit 54.

In this case, even if the deposition solution 1 slightly overflows when the elevated level of the deposition solution 1 in the processing bath 46 exceeds the opening brim due to elevation of the deposition solution vessel 51, the spilt deposition solution 1 falls into the surrounding solution-recovering bath 43, and is collected in the drain vessel 49 through the drain pipe 48.

According to the above manner, the reverse side of the transparent substrate 2 is maintained to be in contact with the surface of the deposition solution 1 in the processing bath 46, and a predetermined voltage is applied between the submerged electrode 4 in the processing bath 46 and the roll electrodes 63a according to the operation of the voltage-controlling circuit 54. At this time, the roll electrodes 63a are pressed onto the non-illustrated electrode pads formed at both end portions of the transparent substrate 2, and these electrode pads are electrically connected to desired transparent electrodes among a plurality of the transparent electrodes 3a, 3b, 3c, 3d, 3e, . . . which have been formed on the transparent substrate 2, as shown in FIG. 12. For example, when the deposition solution 1 in the processing bath 46 is a solution for forming red color layers, the electrode pads are electrically connected to the transparent electrodes 3a, 3d, . . . on which red color layers should be formed. Accordingly, by voltage application between the submerged electrode 4 and the roll electrodes 63a, the deposition solution is electrolyzed while the transparent electrodes 3a, 3d, . . . electrically connected to the roll electrodes 63a are made to serve as anodes, and the submerged electrode 4 in the processing bath 46 is made to serve as a cathode. As a result of this electrolysis, ITO particles having pigment thereon are deposited on the surfaces of the transparent electrodes 3a, 3d, . . . to form color layers having a predetermined thickness.

After completion of forming the color layers over a predetermined time period from the start of voltage application, the deposition-solution vessel 51 is lowered as shown in FIG. 10 to lower the level of the deposition solution 1 in the processing bath 46. The processing bath 46 is then lowered, and the transparent substrate 2 is sent to a succeeding process, for example a washing process, by the substrate-conveying units 62. Accordingly, the processing bath 46 may not be moved upward nor downward during the above process for forming color layers.

The processing bath is moved upward or downward only for previous adjustments of the gap between the transparent substrate 2 and the opening brim of the processing bath 46. However, in a case where thick electrode pads or the like are formed at the peripheral portion of the transparent substrate 2, or when the peripheral portion should not be brought into contact with the deposition solution, the processing bath 46 should preferably be moved up and down before and after the treatment process according to the above-described manner. As a result, knock or contact between the opening brim of the processing bath 46 and the transparent substrate 2 can be securely prevented.

In this example, after the process for forming red color layers, a process for washing the surface on which the layers were formed is performed; next, green color layers were formed in the same manner as above using the processing bath containing a deposition solution for green layers, and the washing process is performed again; and finally, blue layers were formed according to the same treatment, and the washing process is further performed. According to such a series of treatment processes, a color filter could be manufactured in which parallel strip-shaped RGB color layers are formed on the transparent electrodes.

Incidentally, in order to perform electrolytic processing for each color of red, green and blue, the roll electrodes 63a are brought into contact with electrode pads of the transparent substrate 2 such that the pads are different in each process, and thus, the roll electrodes 63a are electrically connected to the transparent electrodes 3b, 3e, . . . in the process for forming the green layers while they are electrically connected to the transparent electrodes 3c, . . . in the process for forming the blue layers.

As to electrolytic conditions for each deposition solution of red, green and blue, the applied voltage is 0.5 V and the voltage-application time period is 20 min. in the process for red; the applied voltage is 0.5 V and the voltage-application time period is 10 min. in the process for green; and the applied voltage is 0.5 V and the voltage-application time period is 7 min. in the process for blue. As to the thicknesses of the color layers, preferable values are 0.8 to 1.6 $\mu$m for red, 0.7 to 1.3 $\mu$m for green, and 0.6 to 1.2 $\mu$m for blue.

As described above, in this example, the transparent electrodes on the transparent substrate 2 are brought into contact with the surface of the deposition solution 1 when an electric current is applied to the transparent electrodes. According to this manner, large spaces can be secured around the transparent substrate, and voltage is applied to the transparent electrodes from the large spaces other than the contacting portions. As a result, the color layers can be formed more uniformly in thickness, the thicknesses can be highly accurately controlled, and further, deposition efficiencies relative to the applied electric current could be improved, as compared to a case where voltage is conventionally applied at only one end of each light-transmissive electrode.

Incidentally, the manner of voltage application is not limited to the above-described example in which a voltage is applied at both end portions of the transparent substrate 2. For example, the entire peripheral portions of the substrate may be equipped with electrode pads, and these pads may be electrically connected to the roll electrodes. Alternatively, voltage-application electrodes may be provided on the surface reverse to the surface on which the transparent electrodes are formed. In both cases, the above-described advantages such as uniformity in thicknesses of the color layers can be achieved.

Further, in this example, the transparent substrate 2 is horizontally conveyed by the substrate-conveying units 62, and positioned above the processing bath 46. According to this manner, inline processing can be introduced. Accordingly, unlike conventional batch processing, the process can easily be automatized, and managed by a smaller number of operators. Additionally, since rapid and efficient continuous processing can be achieved, the productive efficiency can be improved.

Moreover, the deposition solution is brought into contact with only the transparent-substrate surface on which the transparent electrodes were formed. According to this manner, since the deposition solution does not require being in contact with the reverse surface and peripheral portions of the transparent substrate, the washing treatment succeeding the process for forming color layers is easy, and therefore, the processing time period can be reduced. Further, since the amount of the deposition solution taken out to the succeeding process can also be reduced, labor for management of the deposition solution and amount of the solution to be supplied can be reduced.

EXAMPLE 7

Figure 13:
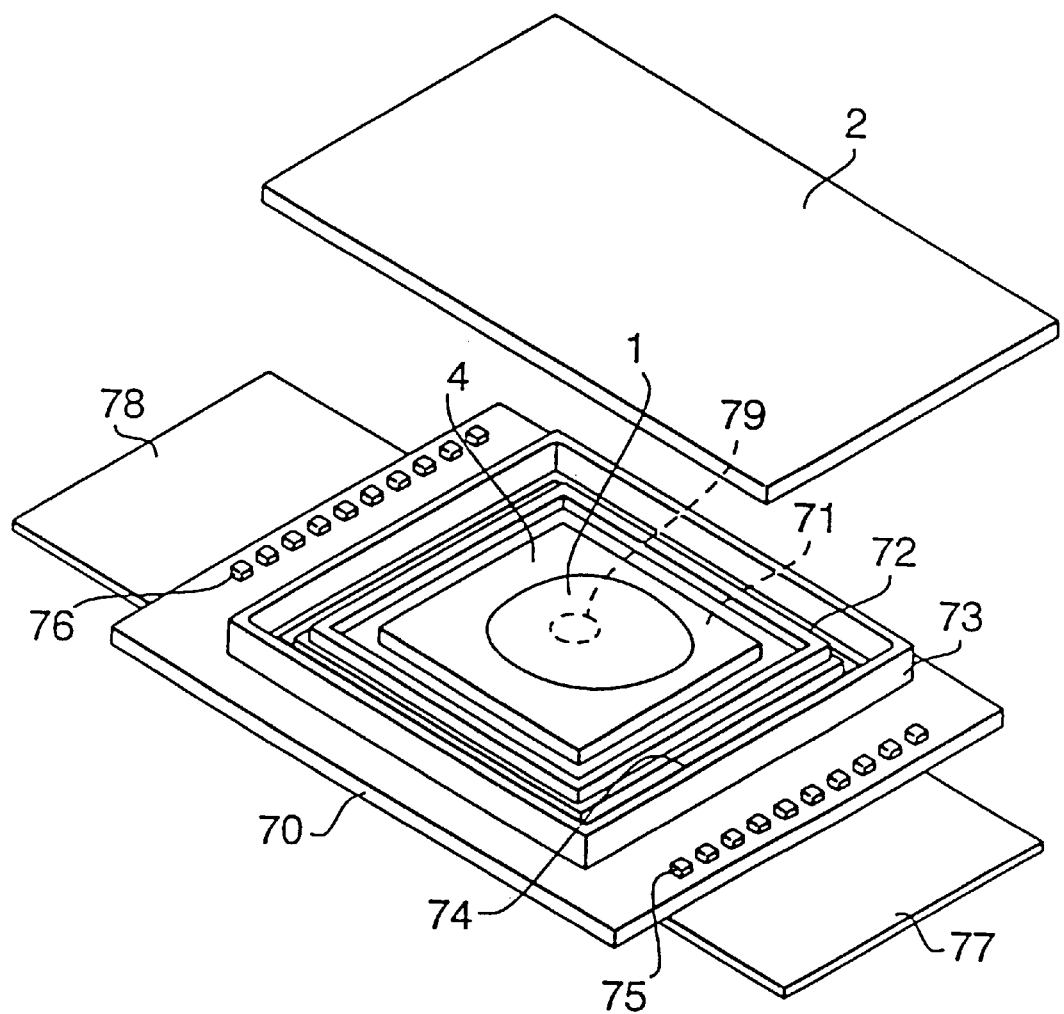
FIG. 13 is a perspective view showing the apparatus of Example 7 for carrying out a method for manufacturing color filters according to the present invention.

FIG. 13 shows the apparatus of Example 7 for carrying out a method for manufacturing color filters according to the present invention. In this apparatus, a processing plate 71 is fixed to the central portion of the surface of a base plate 70, and two sealing frames 72 and 73 comprising flexible synthetic rubber or the like are fixed so as to doubly surround the processing plate 71. A drain groove 74 is formed on the base plate 70 between the sealing frames 72 and 73. Outside the outer sealing frame 73, a plurality of electrode terminals 75 and 76 are arranged in lines.

Figure 14:
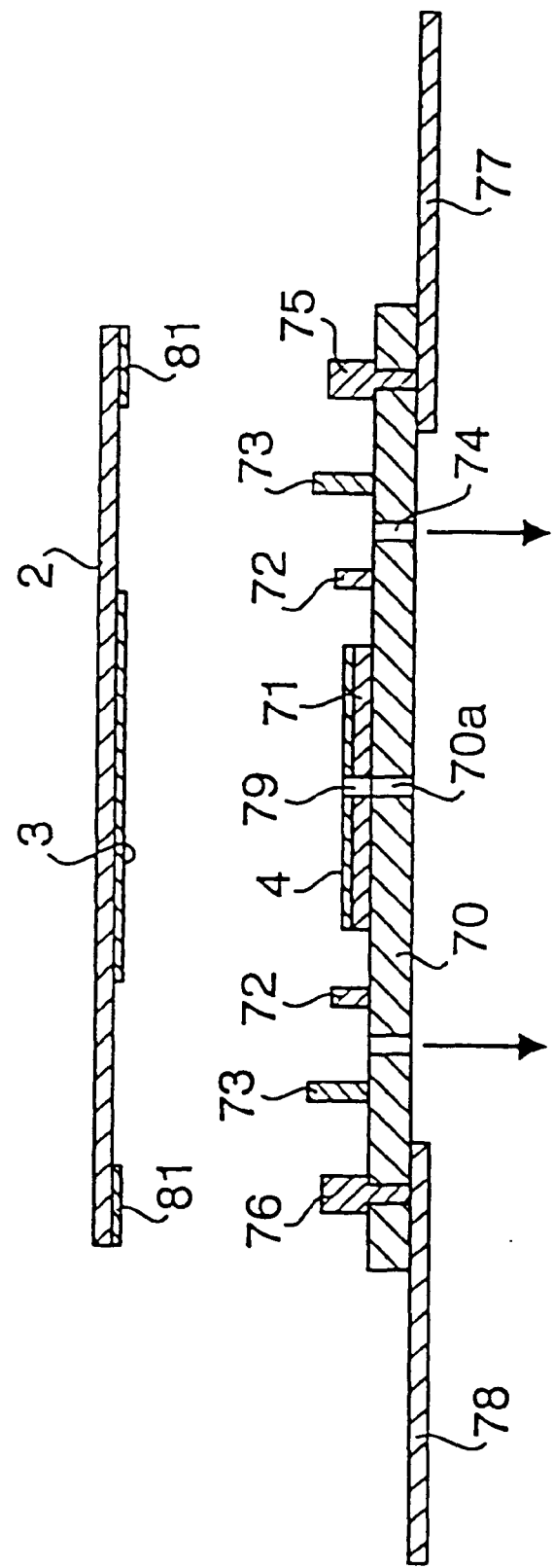
FIG. 14 is a sectional view of the apparatus shown in FIG. 13.

A submerged electrode 4 comprising a coat of platinum or the like is formed on the surface of the processing plate 71, and this submerged electrode 4 is connected to a non-illustrated voltage controller through any one of the wiring lines of flexible wiring substrates 77 and 78 which are electrically connected to the side portions of the base plate 70, respectively. Additionally, a feeding hole 79 is formed in the central portion of the processing plate 71 and the submerged electrode 4, and as shown in FIG. 14, this feeding hole 79 communicates through a feeding hole 70a formed in the base plate 70 to a non-illustrated deposition-solution-feeding pipe which is connected to and disposed under the feeding hole 79.

The inner sealing frame 72 is formed so as to be slightly lower than the outer sealing frame 73. Further, the drain groove 74 formed between the inner sealing frame 72 and the outer sealing frame 73 communicates to a drain vessel through a non-illustrated drain pipe which is connected to and disposed under the base plate 70. Additionally, the electrode terminals 75 and 76 are electrically connected to the wiring lines of the aforementioned flexible substrate 77 and 78 via through-holes formed in the base plate 70, and further, are connected to the non-illustrated voltage controller.

Figure 15:
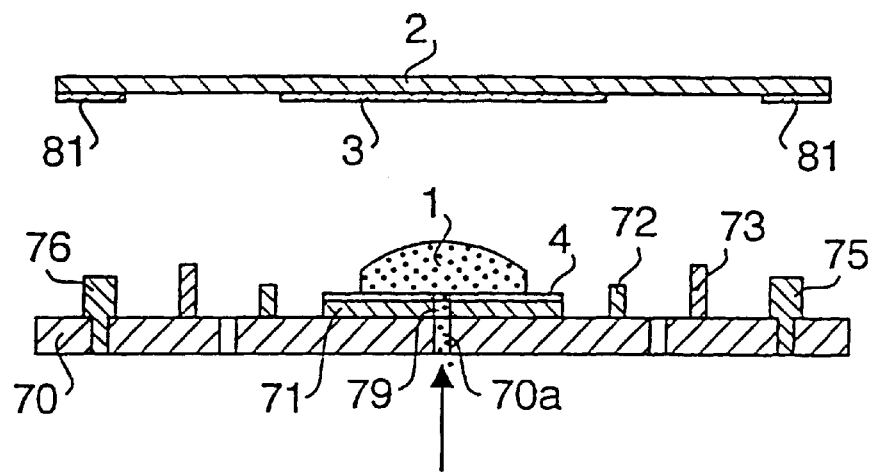
FIG. 15 is a sectional view showing an operation process, and in particular, the feeding of the deposition solution using the apparatus shown in FIG. 13.
Figure 16:
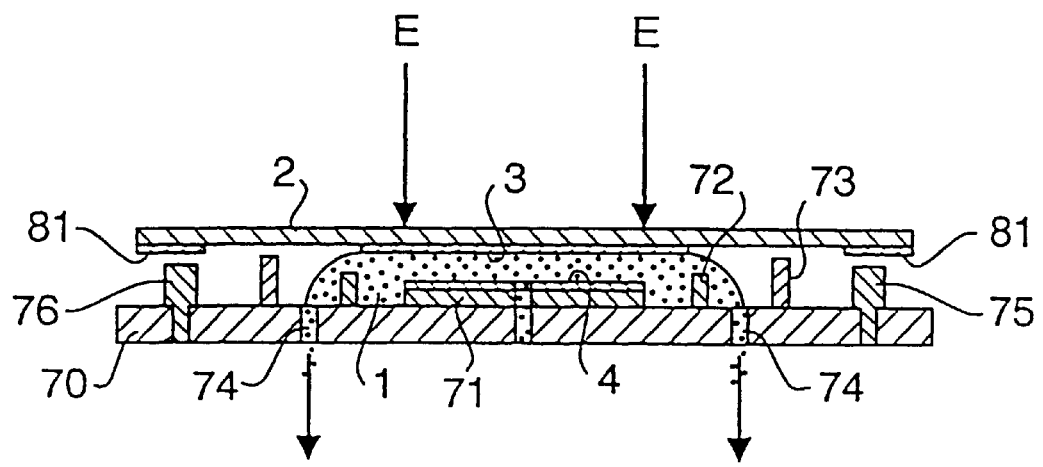
FIG. 16 is a sectional view showing the operation process succeeding the situation shown in FIG. 15.
Figure 17:
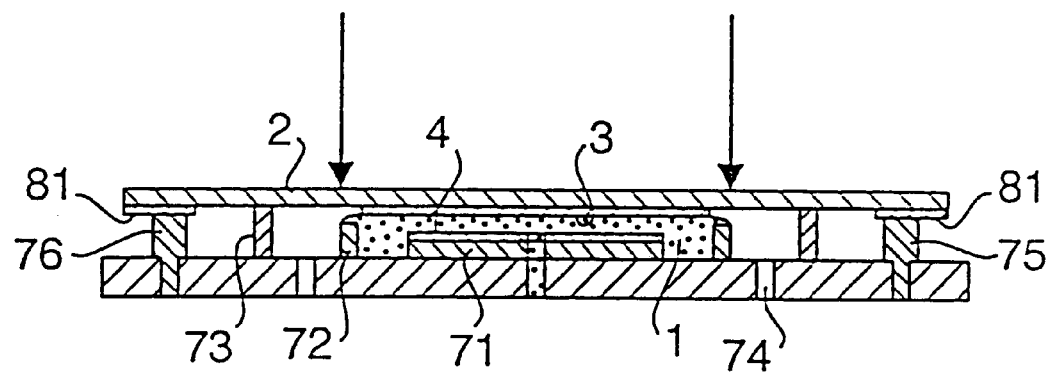
FIG. 17 is a sectional view showing the operation process succeeding the situation shown in FIG. 16.

In the apparatus of this example, a transparent substrate 2 similar to the transparent substrate 2 shown in FIG. 12 is placed on the base plate 70 so as to be in contact with its surface, and color layers are thereby formed from a deposition solution 1. More specifically, a deposition solution 1 is initially fed to the surface of the processing plate 71 through the feeding holes 70a and 79, as shown in FIG. 15. Next, the substrate 2 having transparent electrodes 3 on its lower surface is pressed down as indicated by the arrows E in FIG. 16. As a result, the lower surface of the transparent substrate 2 comes into contact with the sealing frame 73 which has been formed to be higher than the inner sealing frame 72. The space between the transparent substrate 2 and the processing plate 71 inside the sealing frame 73 is filled with the deposition solution 1, and excessive deposition solution 1 is discharged through the drain groove 74.

After this, when the transparent substrate 2 is further pressed down, a plurality of electrode pads 81 which are formed in the peripheral portion of the transparent substrate 2 and electrically connected to the transparent electrodes 3 come into contact with the electrode terminals 75 and 76 to achieve current application to the transparent electrodes 3 formed on a surface of the transparent substrate 2. As a result, a predetermined voltage is applied between the transparent electrodes 3 and the submerged electrode 4 on the processing plate 71 opposite to the transparent electrodes, and the deposition solution 1 retained inside the sealing frame 72 is electrolyzed to form color layers on the transparent electrodes 3.

Hereupon, the sealing frame 72 may either be or not be in contact with the transparent substrate 2 when the electrode pads 81 are in contact with the electrode terminals 75 and 76. In a case where the sealing frame 72 is not in contact with the transparent substrate 2, however, it is necessary to determine the height of the sealing frame 72 such that the lower surface of the transparent substrate 2 comes into contact with the deposition solution 1 retained inside the sealing frame 72 due to surface tension.

For automatic processing according to this example, for example, an adsorption system to adsorption-hold the transparent substrate 2 and a conveying system to convey said adsorption system should be provided. According to such an automatic system, the transparent substrate 2 held by the adsorption system is conveyed to a position above the base plate 70 by the conveying system, and the transparent substrate 2 is pressed down upon the base plate 70. A plurality of transparent substrates 2 can be processed in order by providing such an adsorption and a substrate-conveying system. In this case, a predetermined amount of the deposition solution 1 is fed from below onto the processing plate 71 for each processing.

As described above, also in this example, since the transparent electrodes 3 are brought into contact with the surface of the deposition solution 1 and voltage is applied to the transparent electrodes 3 through their peripheral portions other than the contacting portions, the color layers can be formed more uniformly in thickness, the thicknesses can be highly accurately controlled, and further, deposition efficiencies relative to the applied electric current can be improved, as compared to a case where voltage is conventionally applied at only one end of each transparent electrode. Further, since substantially no driving system should be formed on and around the base plate 70, the apparatus can be constructed with a simple structure and at a low cost as compared to the example shown in FIG. 10.

We claim:

1. A method for manufacturing a color filter by forming a color layer on a light-transmissive electrode formed on a light-transmissive substrate, said color layer mainly transmitting light within a specific wavelength range, comprising:

bringing said light-transmissive electrode into contact with a deposition solution having an electrolytic solution and a pigment material dispersed therein, the deposition solution being placed in a processing bath;

immersing the light-transmissive substrate in said processing bath;

contacting a voltage-application electrode which is provided at an internal surface of said processing bath with said light-transmissive electrode; and applying a voltage through a submerged portion of said light-transmissive electrode and said deposition solution to electrolyze the deposition solution.

2. The method for manufacturing a color filter according to claim 1, wherein:

submerged electrodes are provided on a pair of mutually-opposing internal surfaces of the processing bath;

at least one voltage-application electrode is provided at each internal surface of the processing bath;

the method further comprising:

disposing a plurality of light-transmissive substrates in the processing bath such that each light-transmissive electrode formed on the light-transmissive substrates is opposed to said submerged electrodes; and contacting said voltage-application electrodes with said light-transmissive electrodes.

3. The method for manufacturing a color filter according to claim 2, wherein each voltage application electrode is disposed so as to penetrate the submerged electrodes and a wall of the processing bath, and moves back and forth in the wall of the processing bath.

4. The method for manufacturing a color filter according to claim 1, further comprising:

moving the light-transmissive substrate to cover said opening such that the light-transmissive electrode faces the internal surface of the processing bath, wherein said light-transmissive electrode is brought into contact with a surface of said deposition solution.

5. The method for manufacturing a color filter according to claim 4, further comprising:

providing at least one voltage-application electrode at the internal surface of the processing bath on which the submerged electrode is provided, wherein the voltage is applied between said submerged electrode and the light-transmissive electrode through said voltage application electrode.

6. The method for manufacturing a color filter according to claim 4, wherein the surface of the deposition solution is brought into contact with the light-transmissive electrode by varying the amount of the deposition solution placed in the processing bath.

7. The method for manufacturing a color filter according to claim 1, further comprising:

forming a blue color layer to selectively transmit blue light using a first deposition solution;

forming a red color layer to selectively transmit red light using a second deposition solution; and forming a green color layer to selectively transmit green light using a third deposition solution.

8. The method for manufacturing a color filter according to claim 1, wherein each voltage application electrode is disposed so as to penetrate the submerged electrode and a wall of the processing bath, and moves back and forth in the wall of the processing bath.

9. An apparatus for manufacturing a color filter by forming a color layer on a light-transmissive electrode formed on a light-transmissive substrate, said layer transmitting light within a specific wavelength range, comprising:

a processing bath adapted to contain a deposition solution having an electrolytic solution and a pigment material dispersed therein;

a submergible electrode adapted to be below the surface of said solution when the solution is contained in said processing bath, said submergible electrode provided on an internal surface of the processing bath;

at least one voltage-application electrode provided on said internal surface of the processing bath, wherein a voltage is applied to the light-transmissive electrode formed on the light-transmissive substrate through the voltage-application electrode.

10. The apparatus for manufacturing a color filter according to claim 9, wherein each voltage application electrode is disposed to penetrate a submergible electrode and a wall of the processing bath to move back and forth in the wall of the processing bath.

11. An apparatus for manufacturing a color filter by forming a color layer on a light-transmissive electrode formed on a light-transmissive substrate, said layer transmitting light within a specific wavelength range, comprising:

a processing bath adapted to contain a deposition solution having an electrolytic solution and a pigment material dispersed therein;

submergible electrodes adapted to be below the surface of said solution when the solution is contained in said processing bath, said submergible electrodes provided on a pair of mutually opposing internal surfaces of the processing bath;

at least one voltage-application electrode provided on each of said internal surfaces of the processing bath, wherein a voltage is applied between said submergible electrodes and said light-transmissive electrode formed on the light-transmissive substrate through the at least one voltage-application electrode.

12. The apparatus for manufacturing a color filter according to claim 11, wherein each voltage application electrode is disposed to penetrate a submergible electrode and a wall of the processing bath to move back and forth in the wall of the processing bath.

13. An apparatus for manufacturing a color filter by forming a color layer on a light-transmissive electrode formed on a light-transmissive substrate, said layer transmitting light within a specific wavelength range, comprising:

a processing bath which has an opening, said bath adapted to contain a deposition solution having an electrolytic solution and a pigment material dispersed therein;

a submergible electrode adapted to be below the surface of said solution when the solution is contained in said processing bath, said submergible electrode provided on an internal surface of the processing bath, said internal surface being opposed to said opening; and a voltage-application electrode provided on each of said internal surfaces of the processing bath, wherein a voltage is applied to the light-transmissive electrode formed on the light-transmissive substrate through the one voltage-application electrode.

14. The apparatus for manufacturing a color filter according to claim 13, wherein the voltage-application electrode is formed with an elastic material having conductivity.

15. The apparatus of claim 13, further comprising a table supported by a hinge portion connected to the processing bath, wherein the light transmissive substrate is connected to the table.

16. A method for manufacturing a color filter by forming a color layer on a light-transmissive electrode formed on a light-transmissive substrate, said color layer mainly transmitting light within a specific wavelength range, comprising:

placing a deposition solution having an electrolytic solution and a pigment material in a processing bath;

adjusting the level of the deposition solution at a beginning of a process for forming a color layer such that the surface of said solution is in contact with the light transmissive electrode;

bringing said light-transmissive electrode into contact with the surface of said deposition solution to form a contacting portion;

electrically connecting a voltage-application electrode to said light-transmissive electrode and the surface of said deposition solution;

applying a voltage between said submerged electrode and said light-transmissive electrode to electrolyze said deposition solution; and adjusting the level of the deposition solution at a completion of the process for forming a color layer such that the surface of said solution is separated from the light transmissive electrode.

17. The method for manufacturing a color filter according to claim 16, further comprising dispersing a conductive light-transmissive material in the deposition solution, wherein said conductive light-transmissive material is deposited together with the pigment material on the light transmissive electrode to form the color layer.

18. An apparatus for manufacturing a color filter by forming a color layer on a light-transmissive electrode formed on a light-transmissive substrate, said color layer transmitting light within a specific wavelength range, comprising:

a processing bath adapted to contain a deposition solution having an electrolytic solution and a pigment material dispersed therein;

substrate-holding means for holding the light transmissive substrate such that the light-transmissive electrode on said substrate is in contact with a surface of said deposition solution contained in the processing bath;

a submergible electrode adapted to be below the surface of said solution when the solution is contained in said processing bath, said submergible electrode disposed in said processing bath opposed to the surface of said deposition solution;

a voltage-application electrode electrically connected to said light-transmissive electrode in a portion other than a contacting portion between said light-transmissive electrode and said surface of the deposition solution; and a power-supply unit that applies a predetermined voltage between said submergible electrode and said voltage application electrode.

19. The apparatus for manufacturing a color filter according to claim 18, further comprising solution-surface-contacting/separating means for moving at least one of the light-transmissive substrate and the surface of the deposition solution such that the light-transmissive substrate contacts with or separates from the surface of the deposition solution.

20. The apparatus for manufacturing a color filter according to claim 19, wherein said solution-surface-contacting/separating means moves the surface of the deposition solution.

21. The apparatus for manufacturing a color filter according to claim 18, further comprising a drain portion provided outside the processing bath to receive a portion of the deposition solution discharged from said processing bath.

22. The apparatus for manufacturing a color filter according to claim 18, wherein the substrate-conveying means is provided around the processing bath to convey the light transmissive substrate to a position above the processing bath, and the voltage-application electrode is disposed in said substrate-conveying means.

23. The apparatus for manufacturing a color filter according to claim 22, wherein said substrate-conveying means includes a conveying roll which vertically conveys the light-transmissive substrate, and the voltage-application electrode is disposed on the surface of said conveying roll.

24. An apparatus for manufacturing a color filter by forming a color layer on a light-transmissive electrode formed on a light-transmissive substrate, said layer color transmitting light within a specific wavelength range, comprising:

a base plate;

a feeding hole formed in a central portion of the base plate that provides passage of a deposition solution having an electrolytic solution and a pigment material;

a submergible electrode provided over an internal surface of the base plate;

a sealing frame fixed to the internal surface that surrounds the submergible electrode and contains the deposition solution; and a voltage-application electrode extending from said internal surface of the processing bath, wherein
a voltage is applied between said submergible electrode and the light-transmissive electrode formed on the light-transmissive substrate through the voltage-application electrode.

25. The apparatus of claim 24, further comprising a drain portion formed in the base plate outside the sealing frame to provide passage of a portion of the deposition solution discharged from the sealing frame.

26. The apparatus of claim 25, further comprising an outer sealing frame fixed to the internal surface outside the sealing frame and the drain portion that contains the deposition solution.

27. The apparatus of claim 24, further comprising an electrode pad formed in a peripheral portion of the light-transmissive substrate and electrically connected to the light-transmissive electrode, wherein the electrode pad contacts the voltage-application electrode and the voltage-application electrode is located outside the sealing frame.

28. The apparatus of claim 24, wherein the feeding hole extends through the submergible electrode.

29. A method for manufacturing a color filter by forming a color layer on a light-transmissive electrode formed on a light-transmissive substrate, said layer transmitting light within a specific wavelength range, comprising:

disposing a deposition solution having an electrolytic solution and a pigment material through a feeding hole formed in a central portion of a base plate to cover a submergible electrode placed over an internal surface of the base plate within a sealing frame;

bringing said light-transmissive electrode into contact with the surface of said deposition solution; and applying a voltage between the submergible electrode and said light-transmissive electrode to electrolyze said deposition solution.

30. The method of claim 29, further comprising disposing deposition solution not contained in the sealing frame via a drain portion formed in the base plate outside the sealing frame.

* * * * *